US012458993B1

(12) United States Patent
Kander

(10) Patent No.: US 12,458,993 B1

(45) Date of Patent: Nov. 4, 2025

(54) IN GROUND SPRINKLER ASSEMBLY SERVICEABILITY ENHANCING APPARATUS

(71) Applicant: Keith S. Kander, Tamarac, FL (US)

(72) Inventor: Keith S. Kander, Tamarac, FL (US)

( * ) Notice: Subject to any disclaimer, the term of this patent is extended or adjusted under 35 U.S.C. 154(b) by 561 days.

(21) Appl. No.: 17/719,784

(22) Filed: Apr. 13, 2022

Related U.S. Application Data

(60) Provisional application No. 63/175,538, filed on Apr. 15, 2021.

(51) Int. Cl.
*B05B 15/16* (2018.01)
*B05B 15/622* (2018.01)

(52) U.S. Cl.
CPC ............ *B05B 15/16* (2018.02); *B05B 15/622* (2018.02)

(58) Field of Classification Search
CPC .............................. B05B 15/16; B05B 15/622
See application file for complete search history.

(56) References Cited

U.S. PATENT DOCUMENTS

| | | | |
|---|---|---|---|
| 1,837,322 | A | 12/1931 | Hamilton |
| 1,970,126 | A | 8/1934 | Buckner |
| 2,751,250 | A | 6/1956 | Block |
| 2,756,099 | A | 7/1956 | Reynolds, Jr. |
| 3,015,448 | A | 1/1962 | Hurless |
| 3,018,057 | A | 1/1962 | Anderson |
| 3,021,078 | A | 2/1962 | Nickell |
| 3,117,724 | A | 1/1964 | Ray |
| 3,193,205 | A | 7/1965 | Hanson |
| 3,265,310 | A | 8/1966 | Cohen |
| 3,266,730 | A | 8/1966 | Martini |
| 3,317,144 | A | 5/1967 | Muschett |
| 3,408,006 | A | 10/1968 | Stanwood |
| 3,650,478 | A | 3/1972 | Jones |
| 3,655,132 | A | 4/1972 | Rosie |
| 3,662,956 | A | 5/1972 | Hedman |
| 3,762,642 | A | 10/1973 | DiSanto |
| 3,830,434 | A | 8/1974 | Green et al. |
| 3,874,588 | A | 4/1975 | Flynn |
| 3,904,120 | A | 9/1975 | Sbicca |
| 3,934,820 | A | 1/1976 | Phaup |
| 4,003,520 | A | 1/1977 | Bailey |
| 4,095,744 | A | 6/1978 | Villelli |
| D251,064 | S | 2/1979 | Bergland |
| 4,146,181 | A | 3/1979 | Soos |

(Continued)

*Primary Examiner* — Qingzhang Zhou

(74) *Attorney, Agent, or Firm* — Allen D Hertz, P.A.; Allen D. Hertz

(57) ABSTRACT

An in-ground sprinkler serviceability apparatus that provides a debris free environment for ease of replacement of an in-ground sprinkler head. The sprinkler serviceability apparatus comprises a body and a seal insert. The body has a frustum shaped sidewall extending between a base section and a radially extending flange section. The base section includes a coupling feature in a form of an aperture. The seal insert is fabricated of a pliant material and is designed to provide a seal between a sprinkler head and an interior surface of the body. The body is placed within a cavity dug into the ground, locating a pipe nipple through the coupling feature. A sprinkler head is placed within an interior of the body and placed in fluid communication with the pipe section. The seal insert is inserted between the sprinkler head and the interior surface of the sidewall.

19 Claims, 22 Drawing Sheets

(56) References Cited

U.S. PATENT DOCUMENTS

| | | | | |
|---|---|---|---|---|
| 4,212,426 | A | 7/1980 | Choi | |
| D256,386 | S | 8/1980 | Bergland | |
| 4,350,296 | A | 9/1982 | Kuhlman et al. | |
| 4,429,832 | A | 2/1984 | Sheets | |
| 4,582,256 | A | 4/1986 | Jaquez | |
| 4,781,327 | A | 11/1988 | Lawson et al. | |
| 5,037,030 | A | 8/1991 | Apodaca | |
| 5,039,015 | A | 8/1991 | DeLaVega, Jr. | |
| D333,507 | S | 2/1993 | Colo'n | |
| 5,211,338 | A | 5/1993 | Leite et al. | |
| 5,213,262 | A | 5/1993 | Violette | |
| 5,253,952 | A | 10/1993 | Selway | |
| D347,259 | S | 5/1994 | Fewell et al. | |
| 5,458,290 | A | 10/1995 | Johnson | |
| 5,918,814 | A | 7/1999 | Hough | |
| 5,931,385 | A | 8/1999 | Miller | |
| 5,938,121 | A * | 8/1999 | Ferguson | B05B 15/74 239/203 |
| 5,964,408 | A * | 10/1999 | Musson | B05B 15/74 239/113 |
| 6,047,897 | A | 4/2000 | Ueno et al. | |
| 6,138,924 | A | 10/2000 | Hunter et al. | |
| 6,186,416 | B1 | 2/2001 | Jones | |
| 6,209,803 | B1 | 4/2001 | Colo'n | |
| D457,942 | S | 5/2002 | Bouras | |
| 6,398,131 | B1 | 6/2002 | Kirk | |
| 6,439,476 | B1 | 8/2002 | Boggs | |
| 6,488,218 | B1 | 12/2002 | Townsend et al. | |
| 6,494,386 | B1 | 12/2002 | Banu | |
| 6,543,704 | B2 | 4/2003 | Stephens | |
| 6,764,025 | B1 | 7/2004 | Espina | |
| 7,717,360 | B1 | 5/2010 | Kander | |
| 2001/0032890 | A1 | 10/2001 | Stephens | |

* cited by examiner

IN GROUND SPRINKLER ASSEMBLY SERVICEABILITY ENHANCING APPARATUS

CROSS REFERENCE TO RELATED APPLICATIONS

This application is a Non-Provisional Utility Application, which claims the benefit of U.S. Provisional Patent Application Ser. No. 63/175,538, filed on Apr. 15, 2021, which is incorporated by reference herein in its entirety.

FIELD OF THE INVENTION

The invention relates to an apparatus and method using an in-ground sprinkler serviceability enhancing apparatus wherein said serviceability enhancing apparatus ensures against encroachment of debris about the sprinkler head, both during operation of the sprinkler head as well as replacement or servicing of the sprinkler head.

BACKGROUND OF THE INVENTION

In-ground sprinkler heads are common for both residential and commercial landscapes. The functionality of the sprinkler heads can be inhibited by debris growing or gathering about the top of the sprinkler head. The serviceability can be inhibited by dirt, growth, and debris encroaching into the cavity where the sprinkler head resides. The dirt and debris surrounding a sprinkler head cavity makes it difficult to remove, replace, and service a sprinkler head. Additionally, growth and debris can cover the sprinkler head further inhibiting functionality and serviceability of the sprinkler head.

Several devices have been invented to maintain a sprinkler head free from growth and debris across the top of a sprinkler head.

A first known configuration is an in-ground sprinkler head guard which encompasses a sprinkler head. The first known configuration focuses on a solution to avoid growth and debris from covering the top of the sprinkler head. The first known configuration is limited in that the top shape allows dirt to collect in the upper section, wherein when one removes the sprinkler head, the dirt would fall into the lower section cavity. The design allows dirt to fall into the cavity section and into the sprinkler piping.

A second known configuration is an in-ground sprinkler head guard that encompasses a sprinkler head and is designed to distribute a heavy load away from the sprinkler head. The second known configuration teaches a flat top plate to distribute any applied load between an outer wall and an inner wall of the sprinkler head guard. The requirement of an inner and outer wall of the base section requires a separate cover section for manufacturability. The snap feature between the base and the cover sections dictates a fixed height of the guard.

A third known configuration is a sprinkler protection that surrounds the sprinkler head assembly. The protection system is coupled to the sprinkler head. This is typical in a number of issued Patents. This arrangement limits any serviceability, as the protection system is removed with the sprinkler head assembly.

The inventor of the present invention was issued U.S. Pat. No. 7,717,360 on May 18, 2010. This version has several limitations. A first limitation is that the sprinkler head remains proud of the upper surface of a protective flange. This arrangement exposes the sprinkler head of the sprinkler assembly to potential damage, such as by a lawnmower, a riding lawnmower, and the like. The arrangement limits the design to sprinkler assemblies having a specific diameter. Each unit would have to be designed and fabricated to accommodate sprinkler assemblies of a specific diameter.

What is desired is a means for protecting a sprinkler head, ensuring against encroachment of growth and debris over a sprinkler head, and ensuring growth and debris does not contaminate piping or interfere with a cavity for a sprinkler head. The protection apparatus is preferably designed to protect the entire sprinkler assembly, including the sprinkler head. The protection apparatus is preferably designed to accommodate most sprinkler assemblies of several different diameters.

SUMMARY OF THE PRESENT INVENTION

A first aspect of the present invention is a sprinkler head serviceability apparatus that creates and maintains a receiving cavity for an in-ground sprinkler head.

A second aspect of the present invention is a sprinkler head serviceability device that is adaptable to any sprinkler head of a variety of diameters provided in a variety of different designs from a variety of different manufacturers.

In another aspect, the present invention provides a base member having a cylindrically shaped body extending upward from a threaded coupler and terminating at a flanged element.

In another aspect, the base member having a cylindrically shaped body extending upward from a bottom wall and terminating at the flanged element.

In another aspect, the base member having a cylindrically shaped body extending upward from a bottom wall and terminating at the flanged element, the base member further comprising a coupling section attached to the bottom wall.

In another aspect, the coupling section passes through the bottom wall.

In another aspect, the coupling section passes through and joined to the bottom wall.

In yet another aspect, the base member further includes a reinforcement between the bottom wall and the coupling section.

In yet another aspect, the reinforcement provided between the base member and the coupling section includes a radially extending rib.

In yet another aspect, the reinforcement provided between the base member and the coupling section includes a series of radially extending ribs.

In yet another aspect, the coupling section includes a connection feature for connecting to sprinkler plumbing.

In yet another aspect, the connection feature is a female threaded coupling enabling connectivity of the body with a sprinkler system.

In yet another aspect, the connection feature is a female threaded coupling enabling a threaded sprinkler system pipe section to be threadably inserted through the coupling section. The threaded portion of the pipe section extends through the coupling region of the body, enabling a sprinkler head to be threadably assembled to the exposed region of the threaded pipe section.

In yet another aspect the body further comprises a bottom section, wherein the bottom section transitions between a sidewall of the body and the coupling section.

In yet another aspect the body further comprises at least one drain port passing through the bottom section thereof.

In yet another aspect, the base member includes a frustum shaped sidewall extending upward from the coupling section terminating at the flanged element.

In yet another aspect, the base member includes a sidewall extending upward from the coupling section terminating at the flanged element, the sidewall having a frustum shaped interior surface.

In yet another aspect, the base member includes a lower sidewall interior surface and an upper sidewall interior surface.

In yet another aspect, the lower sidewall interior surface has a frustum shape.

In yet another aspect, the upper sidewall interior surface has a frustum shape.

In yet another aspect, the lower sidewall interior surface has a frustum shape and the upper sidewall interior surface has a frustum shape.

In yet another aspect, the frustum shape of the lower sidewall interior surface and the frustum shape of the upper sidewall interior surface are non-congruent with one another.

In yet another aspect, the base member includes an upper body sealing surface located between the lower sidewall interior surface and the upper sidewall interior surface.

In yet another aspect, the upper body sealing surface located between the lower sidewall interior surface and the upper sidewall interior surface includes a generally horizontally oriented surface, where the generally horizontally oriented surface is equal to or less than 45 degrees from horizontal.

In yet another aspect, the upper body sealing surface located between the lower sidewall interior surface and the upper sidewall interior surface includes a substantially horizontally oriented surface, where the substantially horizontally oriented surface is equal to or less than 15 degrees from horizontal.

In yet another aspect, the upper body sealing surface located between the lower sidewall interior surface and the upper sidewall interior surface is formed as a horizontally oriented "S" shaped transition.

In yet another aspect, the flanged element has a frustum shaped exterior surface, wherein a central section of the flanged element is higher than a peripheral edge of the flanged element creating a tapered surface. The tapered surface directs water and debris away from the center section of the device, and onto the surrounding environment (generally dirt).

In yet another aspect, the flanged element has a domed shaped exterior surface, wherein the central section of the flanged element is higher than the peripheral edge of the flanged element, the flanged element having a dome shaped surface extending therebetween. The dome shaped surface directs water and debris away from the center section of the device, and onto the surrounding environment.

In yet another aspect, the flanged element is supported by at least one support element.

In yet another aspect, the flanged element is supported by at least one support element, wherein the at least one support element is an annularly arranged support element.

In yet another aspect, the flanged element is supported by at least one reinforcement element, wherein the at least one reinforcement element is a rib.

In yet another aspect, the flanged element is supported by at least one reinforcement element, wherein the at least one reinforcement element is a radially extending rib.

In yet another aspect, the flanged element is supported by a series of ribs.

In yet another aspect, the flanged element is supported by a series of radially extending ribs.

In yet another aspect, the flanged element is supported by a series of ribs, wherein the ribs are provided on a lower or bottom side of the flange.

In yet another aspect, the flanged element is supported by a series of radially extending ribs, wherein the radially extending ribs are provided on a lower or bottom side of the flange.

In yet another aspect, the flanged element is supported by a series of ribs, wherein the ribs are provided on an upper side of the flange.

In yet another aspect, the flanged element is supported by a series of radially extending ribs, wherein the radially extending ribs are provided on an upper side of the flange.

In yet another aspect, the flanged element is supported by a combination of an annular support element and a series of radially extending ribs.

In yet another aspect, the flanged element is supported and reinforced by a combination of an annular support element and a series of radially extending ribs, wherein the combination of the annular support element and the series of radially extending ribs are provided on a lower or bottom side of the flange.

In yet another aspect, the flanged element is supported by a combination of an annular support element and a series of radially extending ribs, wherein the combination of the annular support element and the series of radially extending ribs are provided on an upper side of the flange.

In yet another aspect, the present invention includes an insert for the sprinkler head serviceability device wherein the insert is fabricated of a pliant material. The insert is placed within a cavity formed centrally within an upper section of the body.

In yet another aspect, the insert is fabricated of a pliant material, wherein the pliant material can be foam, rubber, silicone, neoprene, and the like.

In yet another aspect, the insert includes an upper segment comprising an upper exterior surface.

In yet another aspect, the upper exterior surface having a frustum shaped surface.

In yet another aspect, the upper exterior surface having a cylindrically shaped surface.

In yet another aspect, the insert includes the upper segment comprising the upper exterior surface and the lower segment comprising the lower exterior surface.

In yet another aspect, the upper exterior surface is designed to seat against an interior surface of the upper segment of the body of the sprinkler head serviceability apparatus. The design can include considerations of a diameter of the upper exterior surface and a compressibility of the pliant material of the insert.

In yet another aspect, the insert includes a lower segment comprising a lower exterior surface.

In yet another aspect, the lower exterior surface having a frustum shaped surface.

In yet another aspect, the lower exterior surface having a cylindrically shaped surface.

In yet another aspect, the lower exterior surface is designed to seat against an interior surface of the lower segment of the body of the sprinkler head serviceability apparatus. The design can include considerations of a diameter of the lower exterior surface and a compressibility of the pliant material of the insert.

In yet another aspect, the insert includes a transition between the upper exterior surface of the upper segment and the lower exterior surface of the lower segment.

In yet another aspect, the transition located between the upper sidewall exterior surface and the lower sidewall exterior surface includes a generally horizontally oriented surface, where the generally horizontally oriented surface is equal to or less than 45 degrees from horizontal.

In yet another aspect, the transition located between the upper sidewall exterior surface and the lower sidewall exterior surface includes a substantially horizontally oriented surface, where the substantially horizontally oriented surface is equal to or less than 15 degrees from horizontal.

In yet another aspect, the transition located between the upper sidewall exterior surface and the lower sidewall exterior surface is formed as a horizontally oriented "S" shaped transition.

In yet another aspect, the insert includes an upper segment comprising an upper interior surface.

In yet another aspect, the upper interior surface having a frustum shaped surface.

In yet another aspect, the upper interior surface having a cylindrically shaped surface.

In yet another aspect, the upper interior surface is designed to receive a sprinkler head of the sprinkler assembly therein. The design can include considerations of a diameter of the upper interior surface and a compressibility of the pliant material of the insert.

In yet another aspect, the insert includes a lower segment comprising a lower interior surface.

In yet another aspect, the lower interior surface having a frustum shaped surface.

In yet another aspect, the lower interior surface having a cylindrically shaped surface.

In yet another aspect, the lower interior surface is designed to enable passage of a body of the sprinkler assembly therethrough. The design can include considerations of a diameter of the lower interior surface and a compressibility of the pliant material of the insert.

In yet another aspect, the insert includes the upper segment comprising the upper interior surface and the lower segment comprising the lower interior surface.

In yet another aspect, the insert is designed to receive a portion of a variety of sprinkler assemblies in an arrangement where a bottom surface of the sprinkler head rests against an upper interior surface of the insert.

In yet another aspect, the insert is designed to receive a portion of a variety of sprinkler assemblies in an arrangement where a bottom surface of the sprinkler head rests against an upper surface of a transition between the upper segment and the lower segment of the insert.

In yet another aspect, the insert is designed to receive a portion of a variety of sprinkler assemblies in an arrangement where the bottom surface of the sprinkler head rests against the upper surface of the transition between the upper segment and the lower segment of the insert, wherein the sprinkler head is at least partially located within an interior void defined by the upper segment.

In yet another aspect, the insert is designed to receive a portion of a variety of sprinkler assemblies in an arrangement where the bottom surface of the sprinkler head rests against the upper surface of the transition between the upper segment and the lower segment of the insert, wherein the sprinkler head is located within an interior void defined by the upper segment.

In yet another aspect, the insert is designed to receive a portion of a variety of sprinkler assemblies in an arrangement where the bottom surface of the sprinkler head rests against the upper surface of the transition between the upper segment and the lower segment of the insert, wherein the sprinkler head is located completely within an interior void defined by the upper segment.

In yet another aspect, the insert is designed to receive a portion of a variety of sprinkler assemblies in an arrangement where a sidewall surface of the sprinkler head rests against the upper interior surface of the upper segment, wherein the sprinkler head is located at least partially within an interior void defined by the upper segment.

In yet another aspect, the insert is designed to receive a portion of a variety of sprinkler assemblies in an arrangement where a sidewall surface of the sprinkler head rests against the upper interior surface of the upper segment, wherein the sprinkler head is located completely within the interior void defined by the upper segment.

In yet another aspect, the insert is designed to receive a portion of a variety of sprinkler assemblies in an arrangement where a sidewall surface of the sprinkler head rests against the frustum shaped upper interior surface of the upper segment, wherein the sprinkler head is located at least partially within the interior void defined by the upper segment.

In yet another aspect, the insert is designed to receive a portion of a variety of sprinkler assemblies in an arrangement where a sidewall surface of the sprinkler head rests against the frustum shaped upper interior surface of the upper segment, wherein the sprinkler head is located completely within the interior void defined by the upper segment.

In yet another aspect, the upper or exposed surface of the insert is tapered, directing water and debris away from a central region thereof.

In yet another aspect, the upper or exposed surface of the insert is tapered, directing water and debris towards the central region thereof.

In yet another aspect, the upper surface of the insert preferably aligns with the upper surface of the body or flange located adjacent to the mating edge of the insert.

In yet another aspect, the upper surface of the insert is located below the upper surface of the body or flange located adjacent to the mating edge of the insert.

In yet another aspect, the upper surface of the insert is located above the upper surface of the body or flange located adjacent to the mating edge of the insert.

In yet another aspect, the insert further comprising a cavity in an upper segment thereof.

In yet another aspect, the insert further comprising a cavity in an upper segment thereof, the cavity being designed to receive and retain a head portion of the sprinkler assembly.

In yet another aspect, the insert further comprising a cavity in an upper segment thereof, the cavity being designed to receive, retain and provide a water tight seal with the head portion of the sprinkler assembly.

In yet another aspect, the insert is designed to locate an upper surface of the sprinkler head assembly (when in a retracted configuration) proximate or below an upper surface of the flange when the sprinkler assembly and the insert are assembled within the sprinkler head serviceability device.

In yet another aspect, the insert is designed to locate an upper surface of the sprinkler head assembly (when in a retracted configuration) aligned with or below an upper surface of the flange when the sprinkler assembly and the insert are assembled within the sprinkler head serviceability device.

In yet another aspect, the body of the sprinkler head serviceability apparatus comprises an adjustable section enabling adjustability of the overall height of said sprinkler head serviceability apparatus.

In yet another aspect, the body of the sprinkler head serviceability apparatus comprises an upper and a lower section, wherein said upper section is adjustably coupled to said lower section providing an adjustable height.

In yet another aspect, the body of the sprinkler head serviceability apparatus comprises an upper and a lower section, wherein said upper section is adjustably coupled to said lower section providing an adjustable height and further enhancing manufacturability for the seal section proximate the opening for said sprinkler head.

In yet another aspect, the body of the sprinkler head serviceability apparatus comprises an upper and a lower section, wherein said upper section is adjustably coupled to said lower section providing an adjustable height, wherein said adjustability is accomplished via a threaded section.

In yet another aspect, the body of the sprinkler head serviceability apparatus comprises an upper and a lower section, wherein said upper section is adjustably coupled to said lower section providing an adjustable height, wherein said adjustability is accomplished via a snap section.

In yet another aspect, a combination of the body of the sprinkler head serviceability apparatus and the upper flange provide stability to the assembly, maintaining the sprinkler assembly in a vertical orientation.

In one aspect directed towards a method for enhancing serviceability of a sprinkler assembly, the method comprising steps of:

- obtaining a sprinkler serviceability enhancing apparatus, the sprinkler serviceability enhancing apparatus comprising:
  - a sprinkler serviceability enhancing apparatus body having a tubular sidewall extending between a base section and a flange section, the base section comprising a coupling feature, the flange section extending radially outward from an upper edge of the tubular sidewall, the coupling feature comprising an aperture, and
  - a seal insert fabricated of a pliant material, the seal insert having a top surface, a bottom surface, an exterior surface extending between the top surface and the bottom surface, and an interior surface extending between the top surface and the bottom surface, the exterior surface shaped to sealably mate with an interior surface of the tubular sidewall and the interior surface sized and shaped for passing a sprinkler body of the sprinkler assembly centrally through the insert seal;
- creating a cavity within a ground;
- placing the sprinkler serviceability enhancing apparatus body into the cavity and inserting a threaded pipe section through the coupling feature;
- inserting a sprinkler body of the sprinkler head assembly through a centrally located aperture of the seal insert;
- inserting the sprinkler assembly into a interior of the sprinkler serviceability enhancing apparatus body, the sprinkler serviceability enhancing apparatus body interior defined by the generally cylindrically shaped sidewall and the base section;
- inserting the seal insert into an upper section of the sprinkler serviceability enhancing apparatus body;
- joining the sprinkler assembly and the threaded pipe section together; and
- wherein a sprinkler head of the sprinkler assembly seals against an interior surface of the seal insert,
- wherein a top surface of the sprinkler head is located level with or below a top surface of the flange section of the sprinkler serviceability enhancing apparatus.

In a second aspect, the method further comprising steps of keeping debris from entering the interior of the sprinkler serviceability enhancing apparatus body by creating a seal between an exterior surface of the sprinkler body and the centrally located aperture of the seal insert and creating a seal between an exterior surface of the seal insert and an interior surface of the sprinkler serviceability enhancing apparatus body.

In another aspect, the flange section further comprises a flange body and an arrangement of axially extending elements extending axially from a lower surface of the flange body, wherein the step of placing the sprinkler serviceability enhancing apparatus body into the cavity includes a step of seating a bottom surface of the flange section against a surface of the ground, wherein the surface of the ground defines an upper edge of the cavity, wherein the axially extending elements provide support between the lower surface of the flange body and the surface of the ground.

In yet another aspect, the flange section further comprising a flange body and an arrangement of axially extending elements extending axially from a lower surface of the flange body, wherein the step of placing the sprinkler serviceability enhancing apparatus body into the cavity includes a step of seating a bottom surface of the flange section against a surface of the ground, wherein the surface of the ground defines an upper edge of the cavity, wherein the axially extending elements provide support between the lower surface of the flange body and the surface of the ground.

In yet another aspect, the step of placing the sprinkler serviceability enhancing apparatus body into the cavity includes a step of seating a bottom surface of the flange section against a surface of the ground, wherein the surface defines an upper edge of the cavity In yet another aspect, the coupling feature is a threaded aperture, wherein the step of joining the sprinkler head assembly and the threaded pipe section together is accomplished by threading the threaded pipe section through the threaded aperture of the base section.

In yet another aspect, the sprinkler serviceability enhancing apparatus body further comprises an upper body sealing surface formed in an interior surface of the tubular sidewall, the seal insert further comprising a seal insert upper segment base sealing surface formed in an exterior surface of the seal insert, the method further comprising a step of seating the insert upper segment base sealing surface against the upper body sealing surface.

In yet another aspect, the seal insert further comprises a seal insert upper segment sprinkler sealing surface formed in an interior surface of the seal insert, the method further comprising a step of seating an in-ground sprinkler head bottom surface of a sprinkler head of the sprinkler assembly against the seal insert upper segment sprinkler sealing surface.

In yet another aspect, the sprinkler serviceability enhancing apparatus body further comprises an upper body sealing surface formed as a radially extending surface in an interior surface of the tubular sidewall, the seal insert further comprising a seal insert upper segment base sealing surface formed as a radially extending surface in an exterior surface of the seal insert, the method further comprising a step of seating the insert upper segment base sealing surface against the upper body sealing surface.

In yet another aspect, the seal insert further comprises a seal insert upper segment interior surface defining a sprinkler head receiving section and a seal insert upper segment sprinkler sealing surface formed in a radially extending flange defining a bottom portion of the sprinkler head receiving section, the method further comprising a step of seating an in-ground sprinkler head bottom surface of a sprinkler head of the sprinkler assembly against the seal insert upper segment sprinkler sealing surface.

In yet another aspect, the seal insert further comprising a seal insert upper segment interior surface defining a sprinkler head receiving section and a seal insert upper segment sprinkler sealing surface formed in a radially extending flange defining a bottom portion of the sprinkler head receiving section, wherein the seal insert upper segment interior surface is sized to accommodate a largest diameter of sprinkler heads of a series of different sized sprinkler assemblies and a diameter of the seal insert upper segment sprinkler sealing surface is sized to accommodate a smallest diameter of sprinkler bodies of the series of different sized sprinkler assemblies, the method further comprising steps of:

adapting the seal insert to accommodate any of the series of different sized sprinkler assemblies by utilizing a thickness and pliant properties of the radially extending flange; and seating an in-ground sprinkler head bottom surface of a sprinkler head of the sprinkler assembly against the seal insert upper segment sprinkler sealing surface.

In yet another aspect, the sprinkler serviceability enhancing apparatus body having a frustum shaped tubular sidewall extending between a base section and a flange section, said frustum shape comprising a larger diameter proximate said flange section and a smaller diameter proximate said base section, said base section comprising a coupling feature, said flange section extending radially outward from an upper edge of said tubular sidewall, said coupling feature comprising an aperture, the method further comprising a step of employing said frustum shape of said body to provide support to said sprinkler serviceability enhancing apparatus.

These and other aspects, features, and advantages of the present invention will become more readily apparent from the attached drawings and the detailed description of the preferred embodiments, which follow.

BRIEF DESCRIPTION OF THE DRAWING

For the purpose of initially illustrating the invention, the specification presents drawings, flow diagrams, and embodiments that are presently preferred as well as alternates. It should be understood, however, that the invention is not limited to the specific instrumentality and methods disclosed herein. It can be recognized that the figures represent a layout in which persons skilled in the art may make variations therein. In the drawings.

Like reference numerals refer to like parts throughout the various views of the drawings.

DETAILED DESCRIPTION OF THE DRAWING

Figure 1:
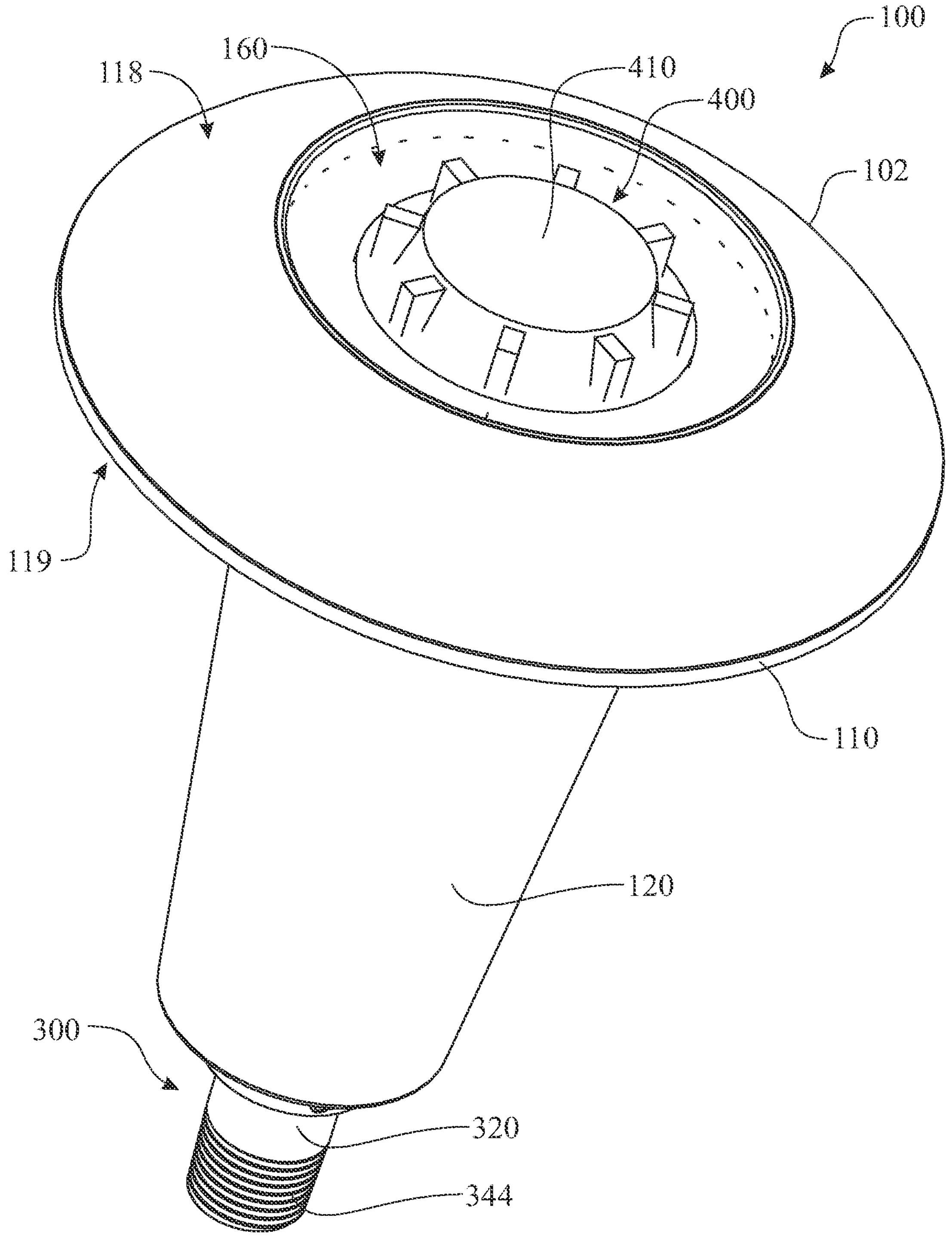
FIG. 1 presents an isometric, top view of a first exemplary sprinkler head serviceability enhancing assembly, the illustration presenting a sprinkler head assembly and a sprinkler riser assembled to the sprinkler head serviceability enhancing assembly.
Figure 2:
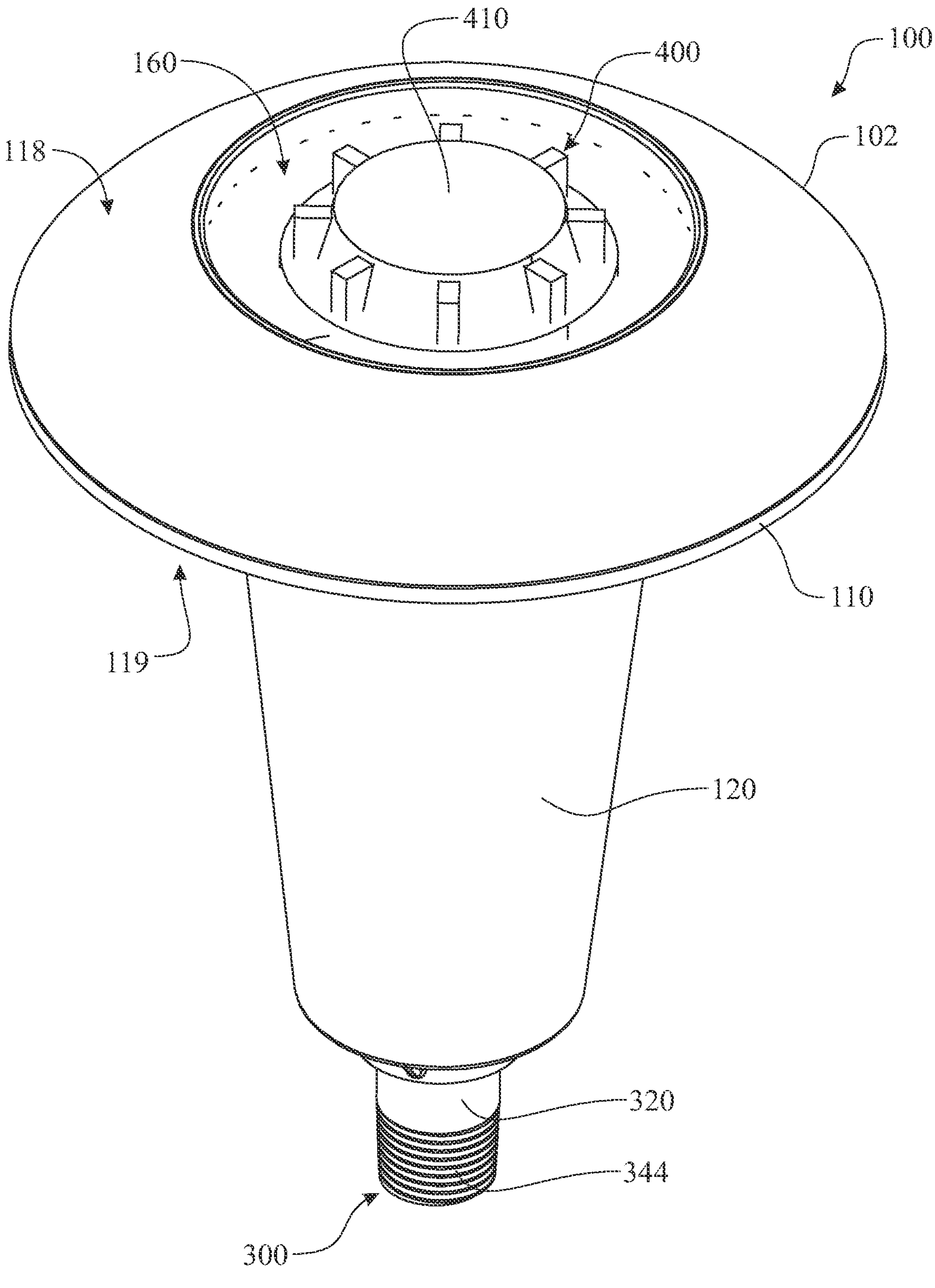
FIG. 2 presents an elevation, top view of the sprinkler head serviceability enhancing assembly originally introduced in FIG. 1, the illustration presenting the sprinkler head assembly and the sprinkler riser assembled to the sprinkler head serviceability enhancing assembly.

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A first exemplary sprinkler head serviceability enhancing apparatus 100 is presented in FIGS. 1 through 8. The first exemplary sprinkler head serviceability enhancing apparatus 100 is designed having two separate elements: a body 102 and a seal insert 160.

The in-ground sprinkler assembly serviceability enhancing apparatus body 102 includes an in-ground sprinkler assembly serviceability enhancing apparatus flange 110 extending radially outward from an upper region or in-ground sprinkler assembly serviceability enhancing apparatus upper annular segment 111 of an in-ground sprinkler assembly serviceability enhancing apparatus body sidewall 120. An in-ground sprinkler assembly serviceability enhancing apparatus body sidewall interior surface 122 defines an interior surface of the body sidewall 120. Similarly, an in-ground sprinkler assembly serviceability enhancing apparatus upper body segment interior surface 112 defines an interior surface of the in-ground sprinkler assembly serviceability enhancing apparatus upper annular segment 111. The body 102 is preferably fabricated of a rigid, molded plastic. Alternatively, the body 102 can be fabricated of a rubber, metal, or any other suitable material.

The in-ground sprinkler assembly serviceability enhancing apparatus upper annular segment 111 and the body sidewall 120 are preferably designed having a like shape, where the upper annular segment 111 is slightly larger in cross section size compared to a like cross section of the body sidewall 120. An in-ground sprinkler assembly serviceability enhancing apparatus upper body sealing surface 113 is preferably provided about an interior surface located between the body sidewall 120 and the upper annular segment 111. The upper body sealing surface 113 can be of any suitable shape. In the exemplary illustration, the upper body sealing surface 113 is provided as a horizontal annular surface.

The body sidewall 120 can be of any suitable shape having an interior volume defined by the body sidewall interior surface 122. In the exemplary illustration, the body sidewall 120 is formed having a frustum shape extending upward from an in-ground sprinkler assembly serviceability enhancing apparatus body bottom wall 130. The frustum shaped body sidewall 120 enables nesting of multiple in-ground sprinkler assembly serviceability enhancing apparatus body sidewalls 120 for compact shipping, storage, and the like. Although illustrated as having a frustum shape, the body sidewall 120 can be of any suitable shape, such as a cylindrically shape structure, a triangularly shaped tubular structure, a square shaped tubular structure, a rectangular shaped tubular structure, a pentagonally shaped tubular structure, a hexagonally shaped tubular structure, an octagonally shaped tubular structure, or any other suitably shaped structure. The body sidewall interior surface 122 can have a shape that is similar to an exterior surface of the body sidewall 120 (as shown) or different from the exterior surface of the body sidewall 120. The body bottom wall 130 can be planar, frustum or funnel shaped, conically shaped, hemispherically shaped, or any other suitable shape. One or more in-ground sprinkler assembly serviceability enhancing apparatus weep hole or drain passages 132 can be provided through the body bottom wall 130, through a lower portion of the sidewall of the body sidewall 120, or both, to enable drainage of water or other moisture. In a design where the in-ground sprinkler assembly serviceability enhancing apparatus weep hole or drain passage 132 is of a diameter enabling encroachment of debris, a screen or other filtering element can be assembled to the body 102 covering the weep hole or drain passage 132.

The flange 110 can be of any suitable shape to provide protection to an in-ground sprinkler assembly 400 from the elements (such as moisture, dirt, leaves, roots, and the like), animals, human traffic, lawn maintenance equipment/machinery, and any other objects that would contact the in-ground sprinkler assembly serviceability enhancing apparatus 100. In the exemplary illustration, an in-ground sprinkler assembly serviceability enhancing apparatus flange upper surface 118 of the flange 110 has a convex shape. The flange 110 is preferably shaped having a higher section proximate the upper end of the body sidewall 120 and a lower edge distal from the body sidewall 120. This design directs flow of elements (including moisture, dirt, leaves, roots, and the like) away from the in-ground sprinkler assembly 400. Examples of suggested shapes include a convex shape, a hemispherical shape, a conical shape, a frustum shape, a pyramid shape, a frustum shaped polygon, a frustum shaped polyhedron, or any other tapered surface. An in-ground sprinkler assembly serviceability enhancing apparatus flange lower surface 119 of the in-ground sprinkler assembly serviceability enhancing apparatus flange 110 is preferably planar or slightly convex and designed to be seated against a ground surface.

Figure 3:
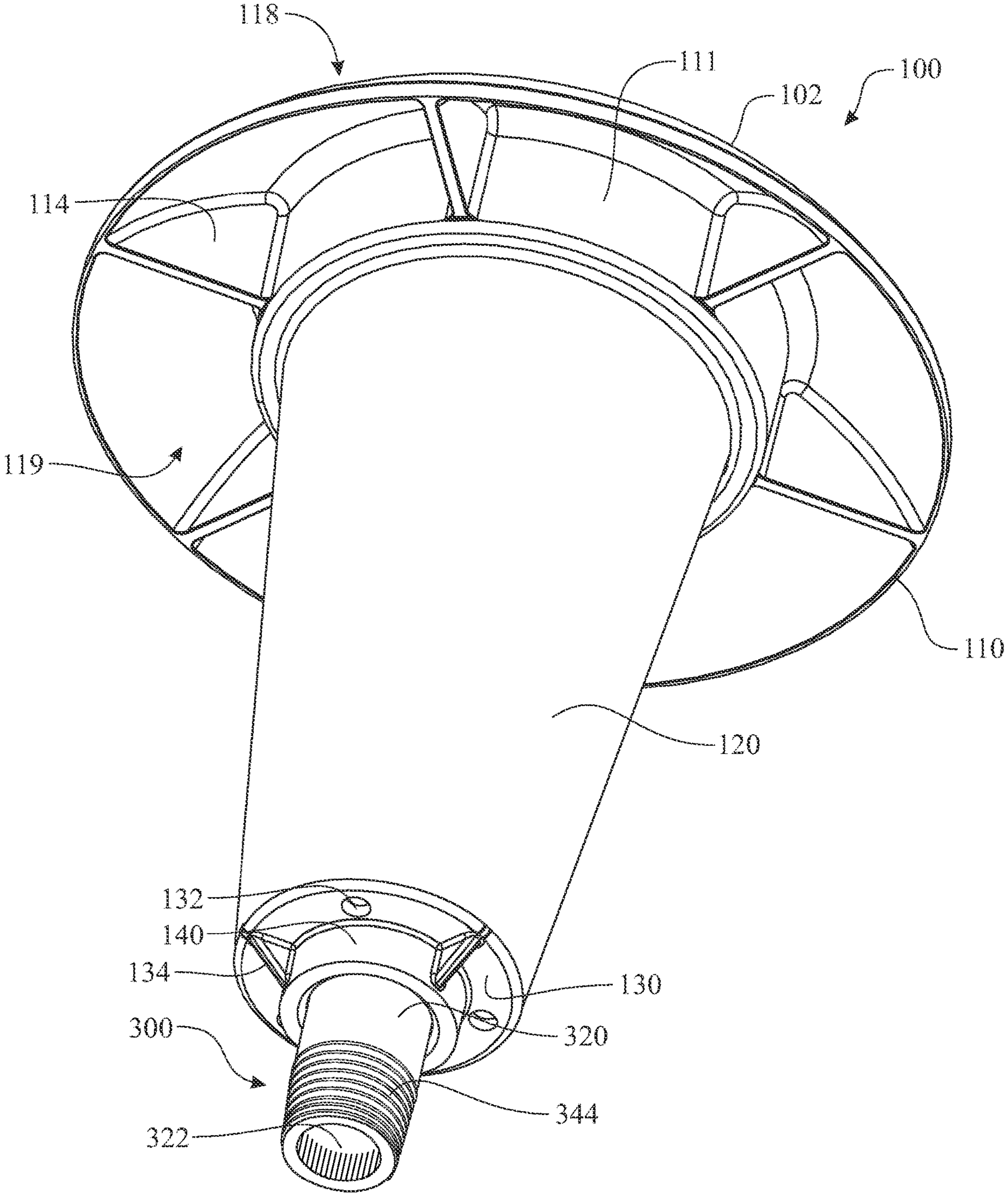
FIG. 3 presents an isometric, bottom view of the sprinkler head serviceability enhancing assembly originally introduced in FIG. 1, the illustration presenting the sprinkler riser assembled to the sprinkler head serviceability enhancing assembly.
Figure 4:
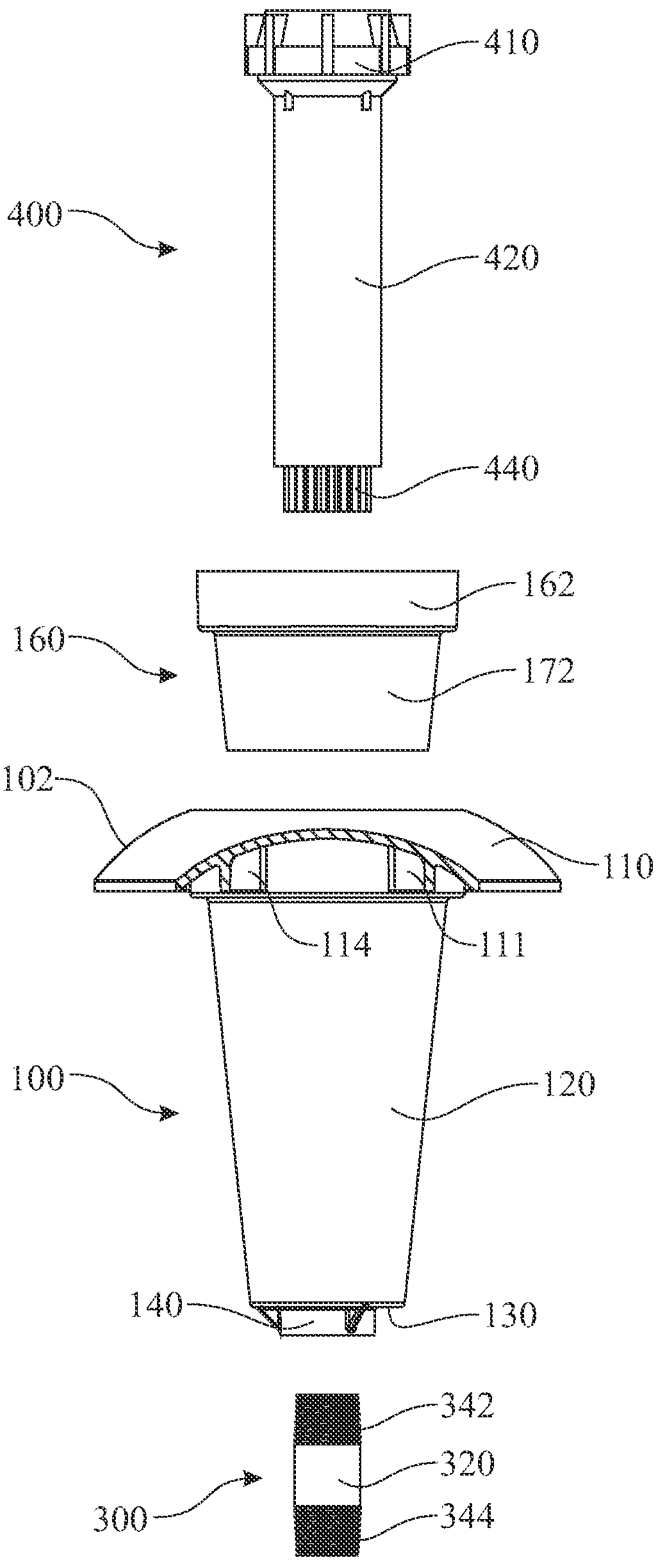
FIG. 4 presents an exploded assembly elevation view of the sprinkler head serviceability enhancing assembly originally introduced in FIG. 1 in conjunction with a sprinkler head assembly and a sprinkler head connecting riser.

The body 102 can include reinforcements, such as a series of in-ground sprinkler assembly serviceability enhancing apparatus upper flange reinforcement structures 114 introduced in FIG. 3. The in-ground sprinkler assembly serviceability enhancing apparatus upper flange reinforcement structures 114 can be of any design (orientation, shape, size, etc.) to provide structural support to the flange 110. In the exemplary illustration, each in-ground sprinkler assembly serviceability enhancing apparatus flange reinforcement structure 114 is arranged extending radially from an upper annular segment 111 located proximate an upper region of the body sidewall 120 and extending axially from an underside or lower surface of the flange 110. Interfaces between the flange reinforcement structure 114 and the adjoining surfaces are preferably filleted. The reinforcement members can be of any suitable size, shape and orientation. A second reinforcement configuration will be described in the detailed description of FIGS. 9-21. Although the exemplary in-ground sprinkler assembly serviceability enhancing apparatus upper flange reinforcement structures 114 are illustrated extending downward from the underside or bottom surface of the flange 110, it is understood that the in-ground sprinkler assembly serviceability enhancing apparatus upper flange reinforcement structures 114 can be located on a top surface of the flange 110, where the flange 110 would extend radially from the upper annular segment 111 in a more planar arrangement and would incorporate a cover. The cover would be shaped to direct moisture and debris away from the in-ground sprinkler assembly 400. The inclusion of the reinforcement structure reduces the volume of material used to fabricate the flange 110, thus reducing costs and weight of the in-ground sprinkler assembly serviceability enhancing apparatus body 102.

The in-ground sprinkler assembly 400 can be any in-ground sprinkler, including a fixed spray sprinkler head, a pop-up sprinkler head, a gear driven sprinkler head, a rotary sprinkler head, a pop-up rotary sprinkler head, and the like.

Figure 5:
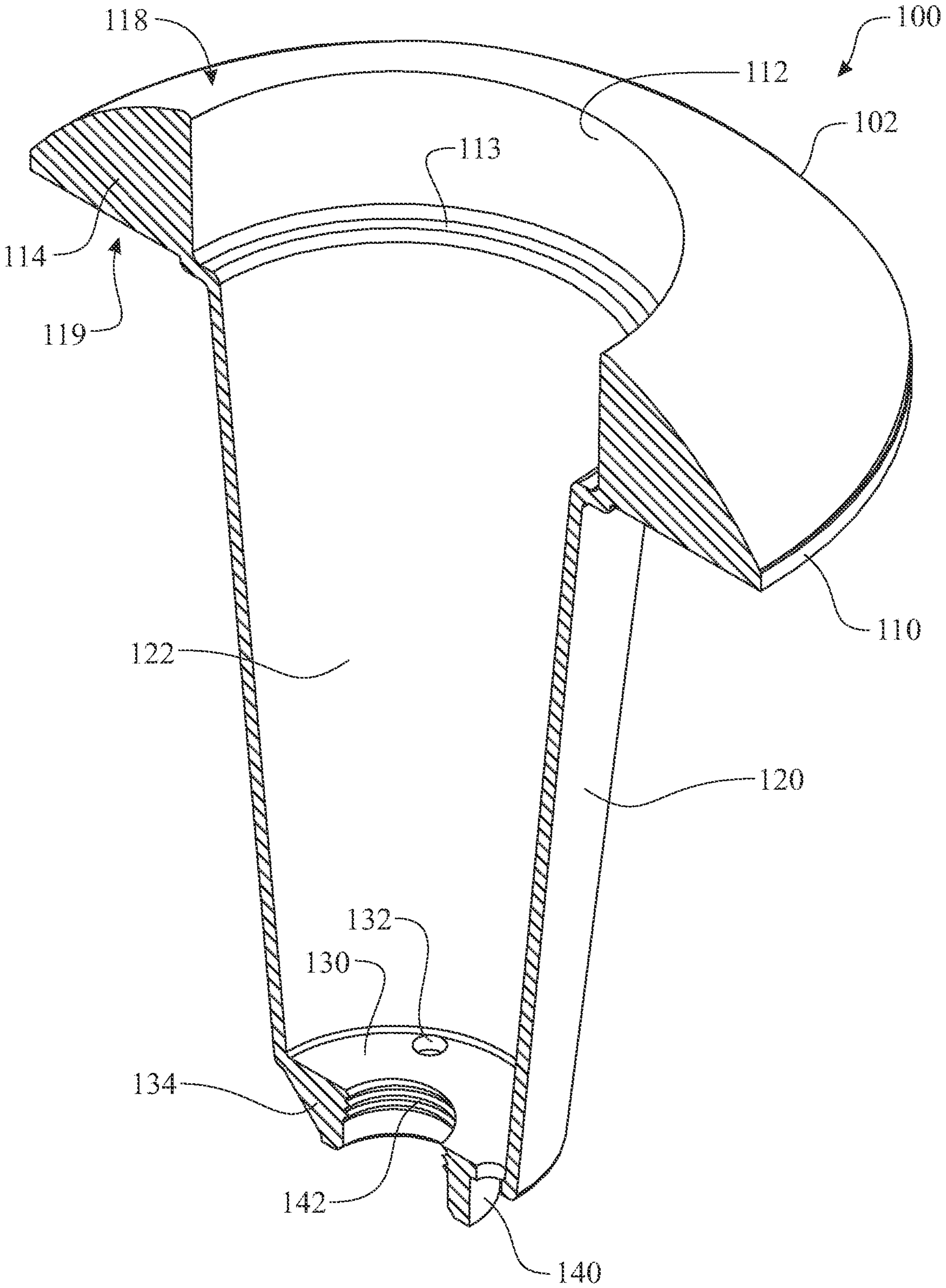
FIG. 5 presents a sectioned isometric top view of a body of the sprinkler head serviceability enhancing assembly originally introduced in FIG. 1, the section being taken along a longitudinal central axis.
Figure 6:
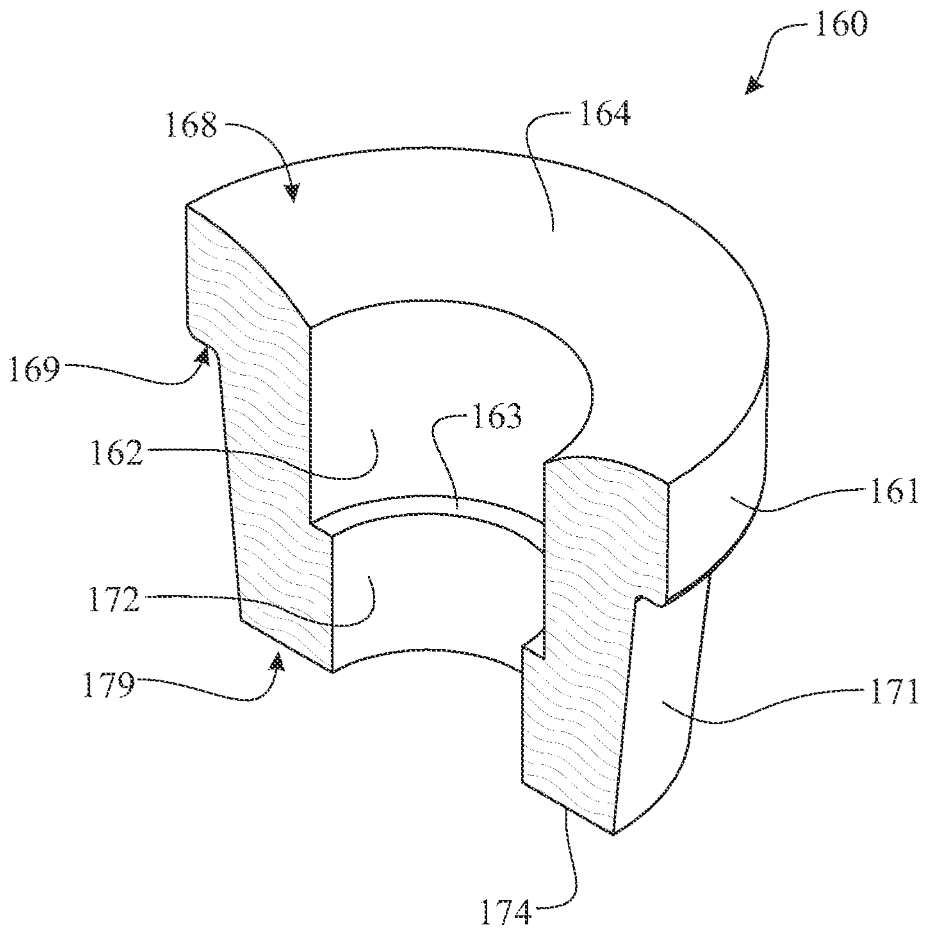
FIG. 6 presents a sectioned isometric top view of an insert of the sprinkler head serviceability enhancing assembly originally introduced in FIG. 1, the section being taken along a longitudinal central axis.
Figure 7:
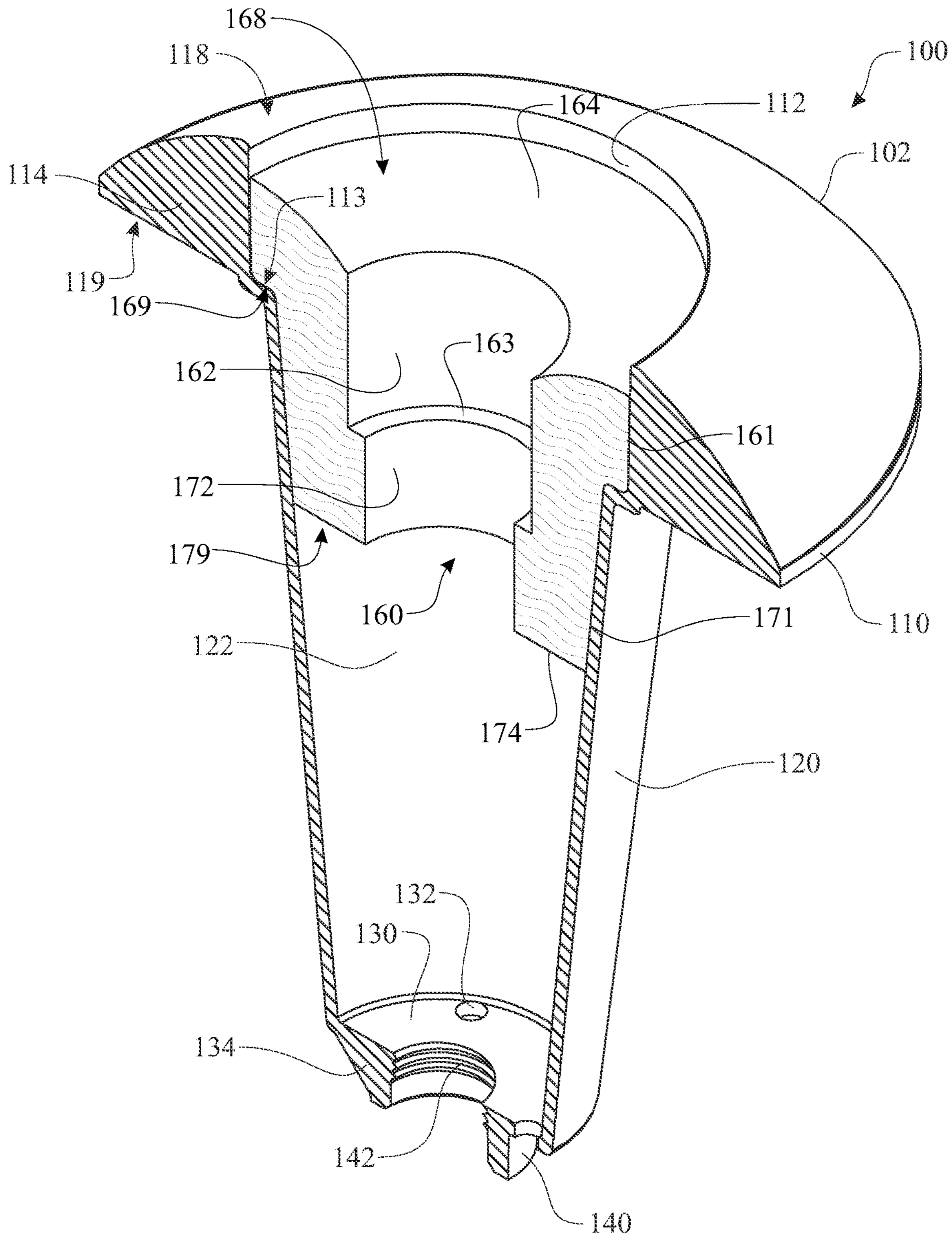
FIG. 7 presents a sectioned isometric top view of the body and the insert of the sprinkler head serviceability enhancing assembly originally introduced in FIG. 1 illustrating the assembly of one another, the section being taken along a longitudinal central axis.

An in-ground sprinkler assembly serviceability enhancing apparatus coupling segment 140 is located at a lower region of the body sidewall 120. As best shown in FIG. 5, the body coupling segment 140 is formed extending downward from the body bottom wall 130. The body coupling segment 140 is formed within the bottom section of the in-ground sprinkler assembly serviceability enhancing apparatus body 102, preferably in a concentric arrangement about the bottom section thereof. It is also understood that the body coupling segment 140 can extend through the body bottom wall 130. The body coupling segment 140 includes a coupling feature, where the coupling feature enables a water-tight coupling between the body 102 and a sprinkler system plumbing. The coupling feature can be of any suitable design, including a threading, a twist and lock arrangement, a quick disconnect, and the like. The coupling feature can alternatively be provided as a smooth cylindrical wall enabling insertion and bonding using a bonding agent such as PVC cement. In the exemplary illustration the coupling feature 142 is a coupling segment threading 142. The coupling feature can be located on an interior surface of the body coupling segment 140 (as illustrated) creating a female coupling arrangement or the coupling feature can be located on an exterior surface of the body coupling segment 140 (as illustrated) creating a male coupling arrangement. In an arrangement where the coupling feature is located on the interior surface of the body coupling segment 140 (as illustrated), the exterior surface can have a square or hexagonal cross section shape for receiving a wrench or other tool to aid in assembly and/or disassembly.

One or more reinforcement members 134 can be included to provide structural support between the body coupling segment 140 and the body bottom wall 130. The in-ground sprinkler assembly serviceability enhancing apparatus body bottom reinforcement structure 134 can be of any suitable shape, size, orientation, and the like. In the exemplary illustration, a series of in-ground sprinkler assembly serviceability enhancing apparatus body bottom reinforcement structures 134 are radially arranged extending between an exterior surface of the body coupling segment 140 and a lower surface of the body bottom wall 130. The in-ground sprinkler assembly serviceability enhancing apparatus body bottom reinforcement structures 134 can be located on an exterior of the body sidewall 120, an interior of the body sidewall 120, or both. When the in-ground sprinkler assembly serviceability enhancing apparatus body bottom reinforcement structures 134 are located on the interior of the body sidewall 120, the in-ground sprinkler assembly serviceability enhancing apparatus body bottom reinforcement structures 134 would be designed to avoid interference with the insertion, assembly, and operation of the in-ground sprinkler assembly 400.

An in-ground sprinkler assembly serviceability enhancing apparatus sealing insert 160 is designed to provide a seal and support between the in-ground sprinkler assembly 400 and the in-ground sprinkler assembly serviceability enhancing apparatus body 102. The sealing insert 160 is preferably fabricated of a pliant or compressible material, such as a foam, silicone, soft rubber, or any other suitable material. The exemplary sealing insert 160 extends between an in-ground sprinkler assembly serviceability enhancing apparatus seal insert upper surface 164 and an in-ground sprinkler assembly serviceability enhancing apparatus seal insert lower surface 174; the seal insert upper surface 164 defining an in-ground sprinkler assembly serviceability enhancing apparatus seal insert top 168 and the seal insert lower surface 174 defining an in-ground sprinkler assembly serviceability enhancing apparatus seal insert bottom 179.

The exemplary sealing insert 160 includes an in-ground sprinkler assembly serviceability enhancing apparatus seal insert upper segment 161 provided at an upper region of an in-ground sprinkler assembly serviceability enhancing apparatus seal insert lower segment 171. An in-ground sprinkler assembly serviceability enhancing apparatus insert upper segment base sealing surface 169 is formed at a transition between an exterior surface of the seal insert upper segment 161 and an exterior surface of the seal insert lower segment 171. An in-ground sprinkler assembly serviceability enhancing apparatus seal insert upper segment interior surface 162 defines an interior void of the seal insert upper segment 161. An in-ground sprinkler assembly serviceability enhancing apparatus seal insert lower segment interior surface 172 defines an interior void of the seal insert lower segment 171. An in-ground sprinkler assembly serviceability enhancing apparatus insert upper segment sprinkler sealing surface 163 is defined at a transition formed between the seal insert upper segment interior surface 162 and the seal insert lower segment interior surface 172. The insert upper segment sprinkler sealing surface 163 is preferably formed as a horizontal annular surface.

Figure 8:
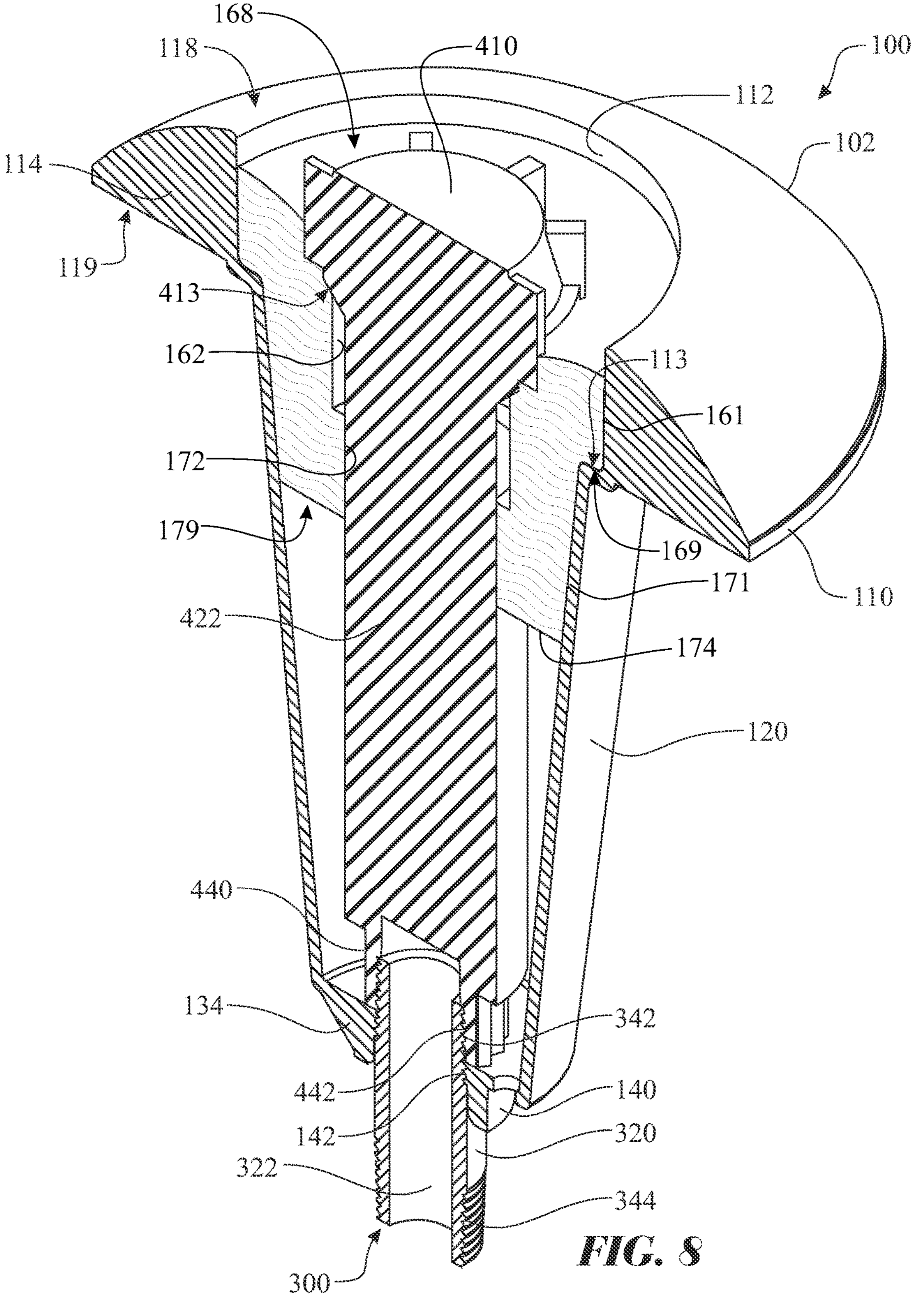
FIG. 8 presents a sectioned isometric top view of the body and the insert of the sprinkler head serviceability enhancing assembly originally introduced in FIG. 1 illustrating the assembly of one another, further introducing a sprinkler head assembly and a sprinkler head riser as assembled to the sprinkler head serviceability enhancing assembly, the section being taken along a longitudinal central axis.
Figure 9:
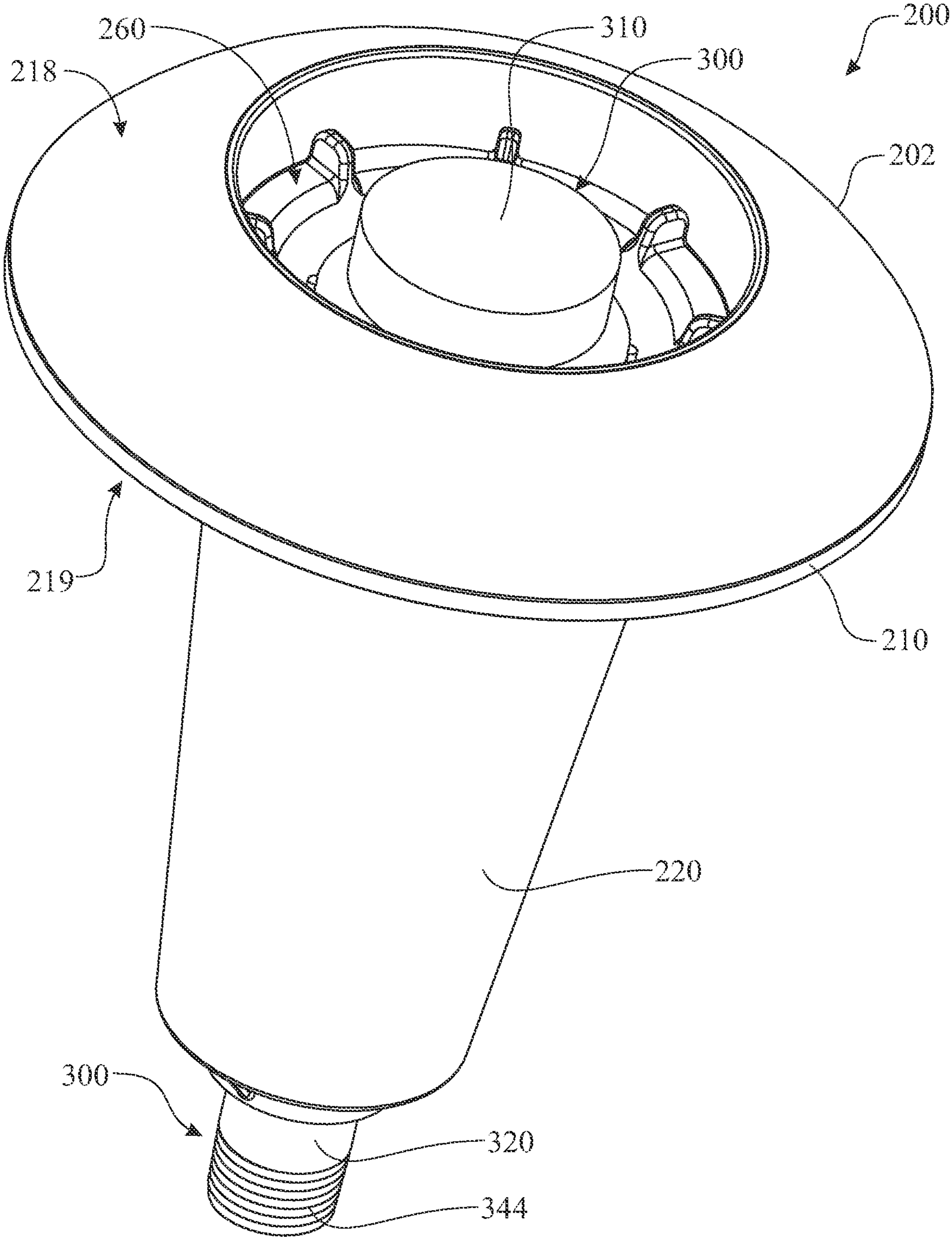
FIG. 9 presents an isometric, top view of a variant of a sprinkler head serviceability enhancing assembly, the illustration presenting a sprinkler head assembly and a sprinkler riser assembled to the sprinkler head serviceability enhancing assembly.
Figure 10:
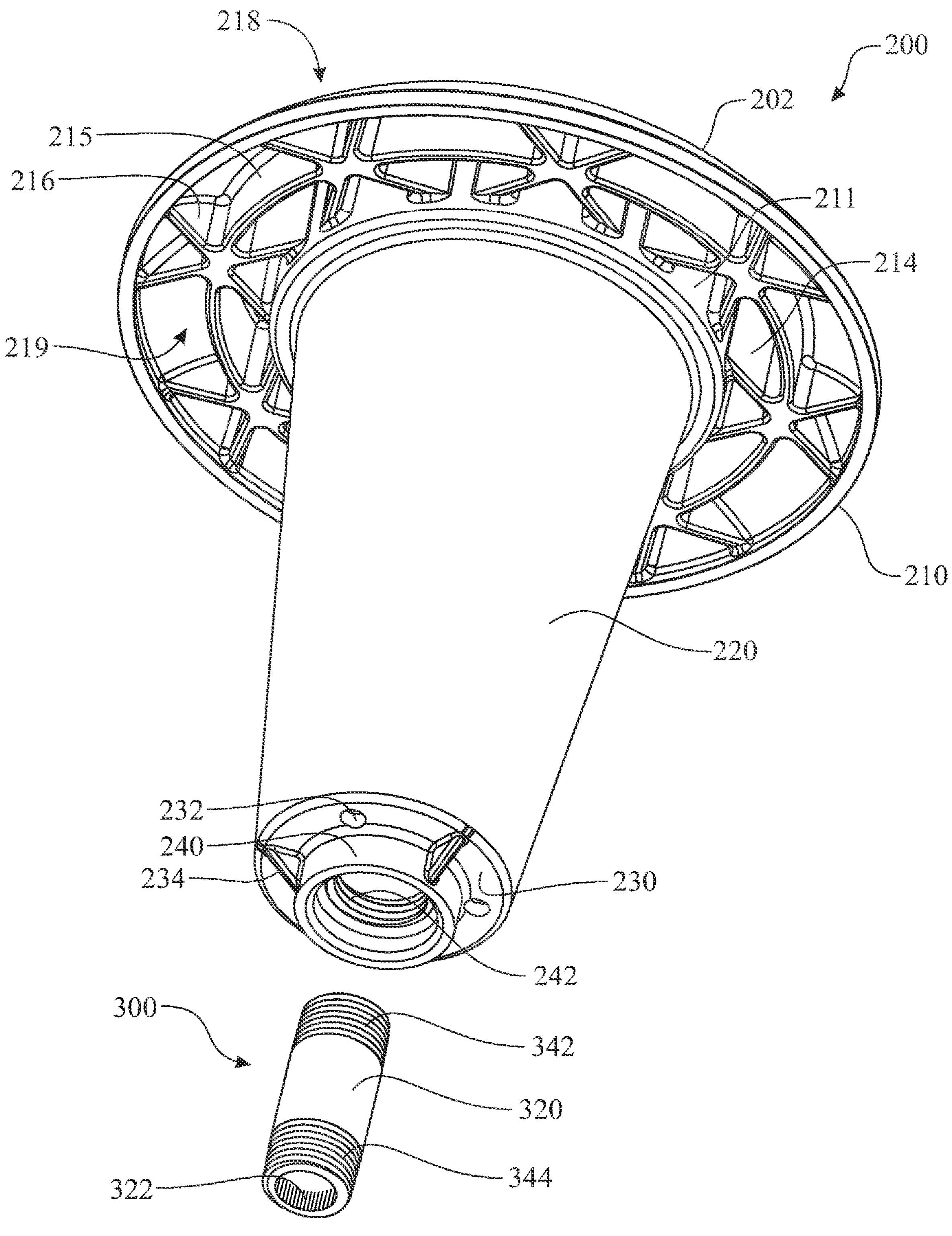
FIG. 10 presents an elevation, top view of the sprinkler head serviceability enhancing assembly originally introduced in FIG. 9, the illustration presenting the sprinkler riser being assembled to the sprinkler head serviceability enhancing assembly.
Figure 11:
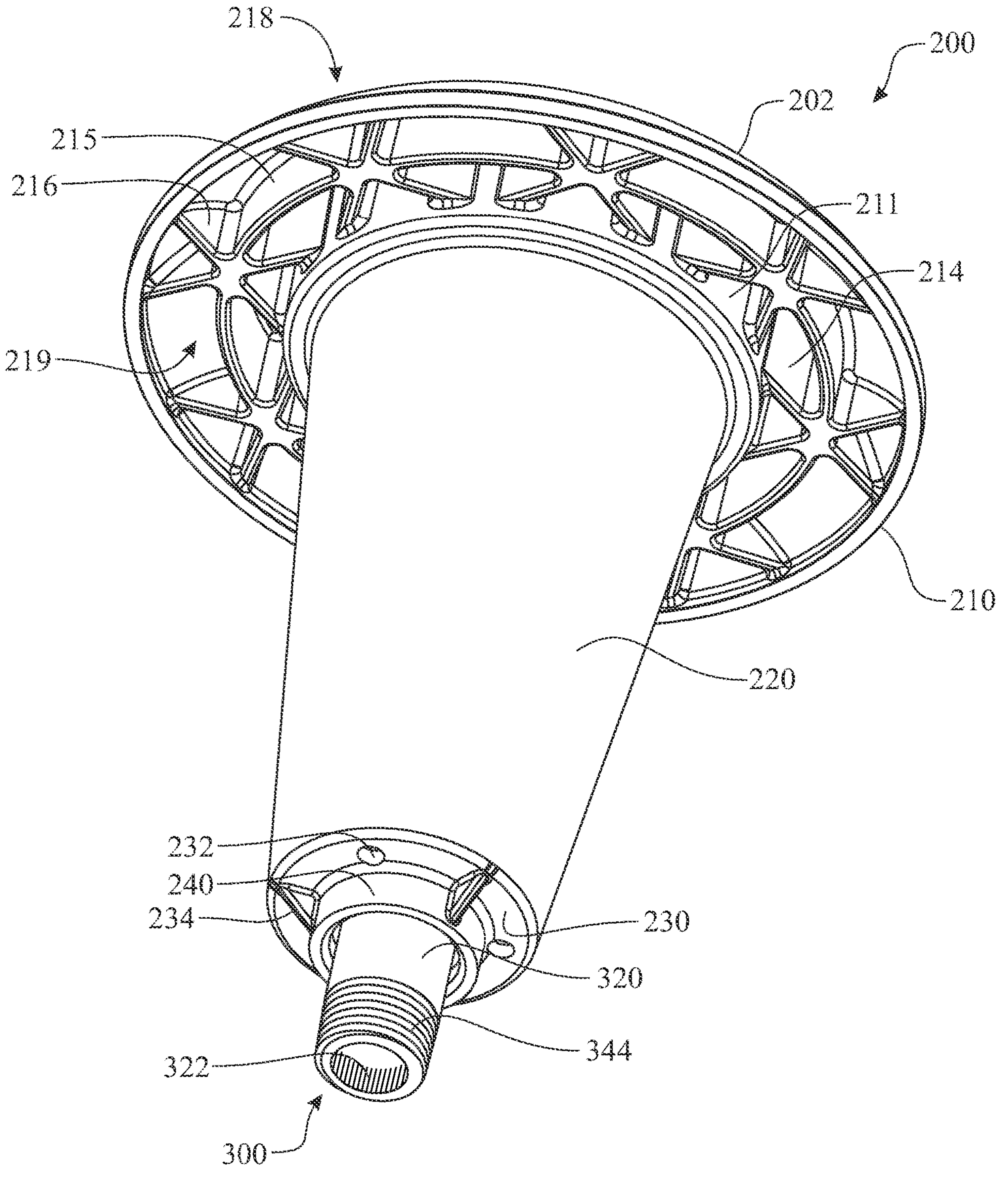
FIG. 11 presents an isometric, bottom view of the sprinkler head serviceability enhancing assembly originally introduced in FIG. 9, the illustration presenting the sprinkler riser assembled to the sprinkler head serviceability enhancing assembly.
Figure 12:
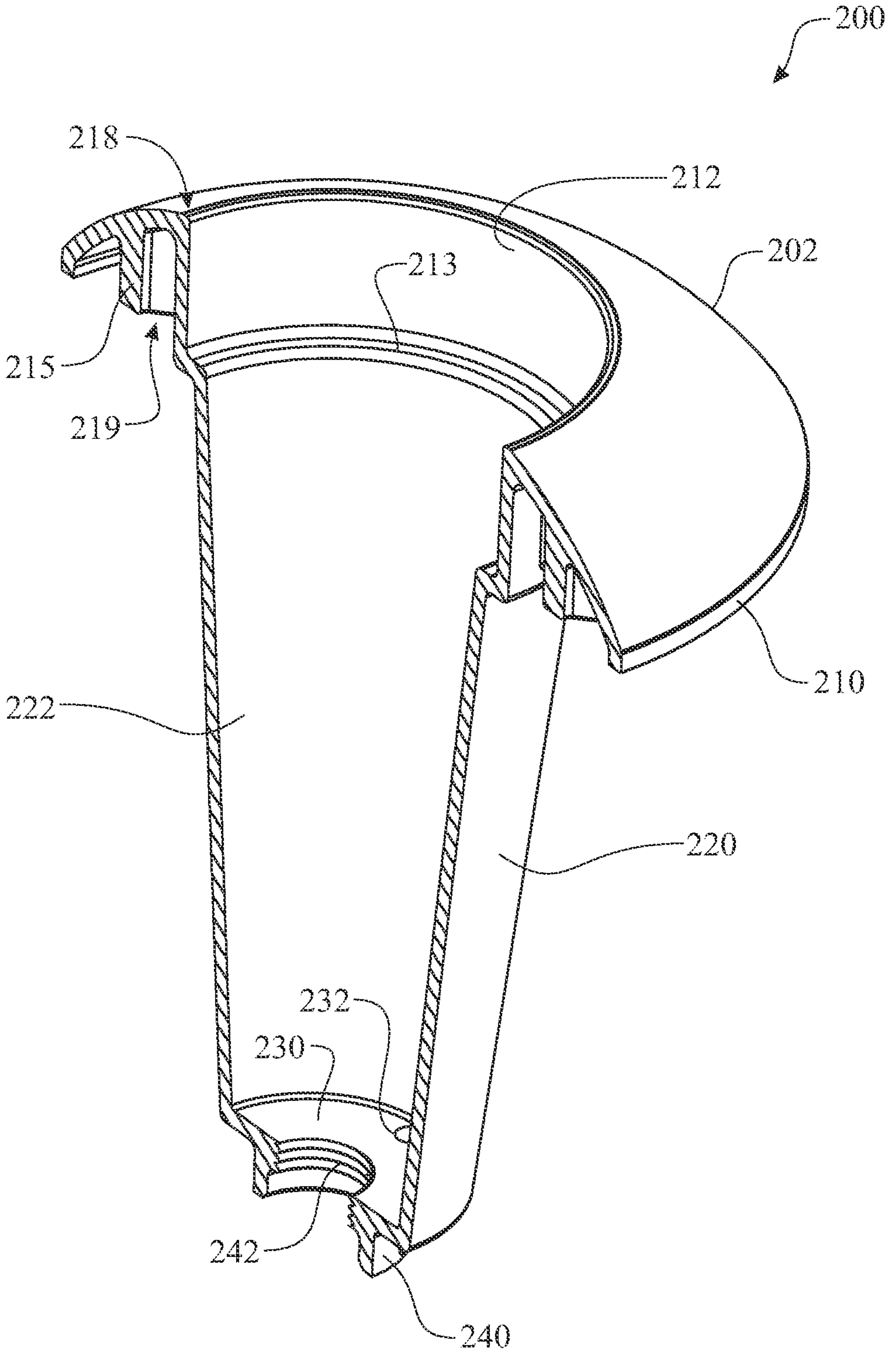
FIG. 12 presents a sectioned isometric top view of a body of the sprinkler head serviceability enhancing assembly originally introduced in FIG. 9, the section being taken along a longitudinal central axis.
Figure 13:
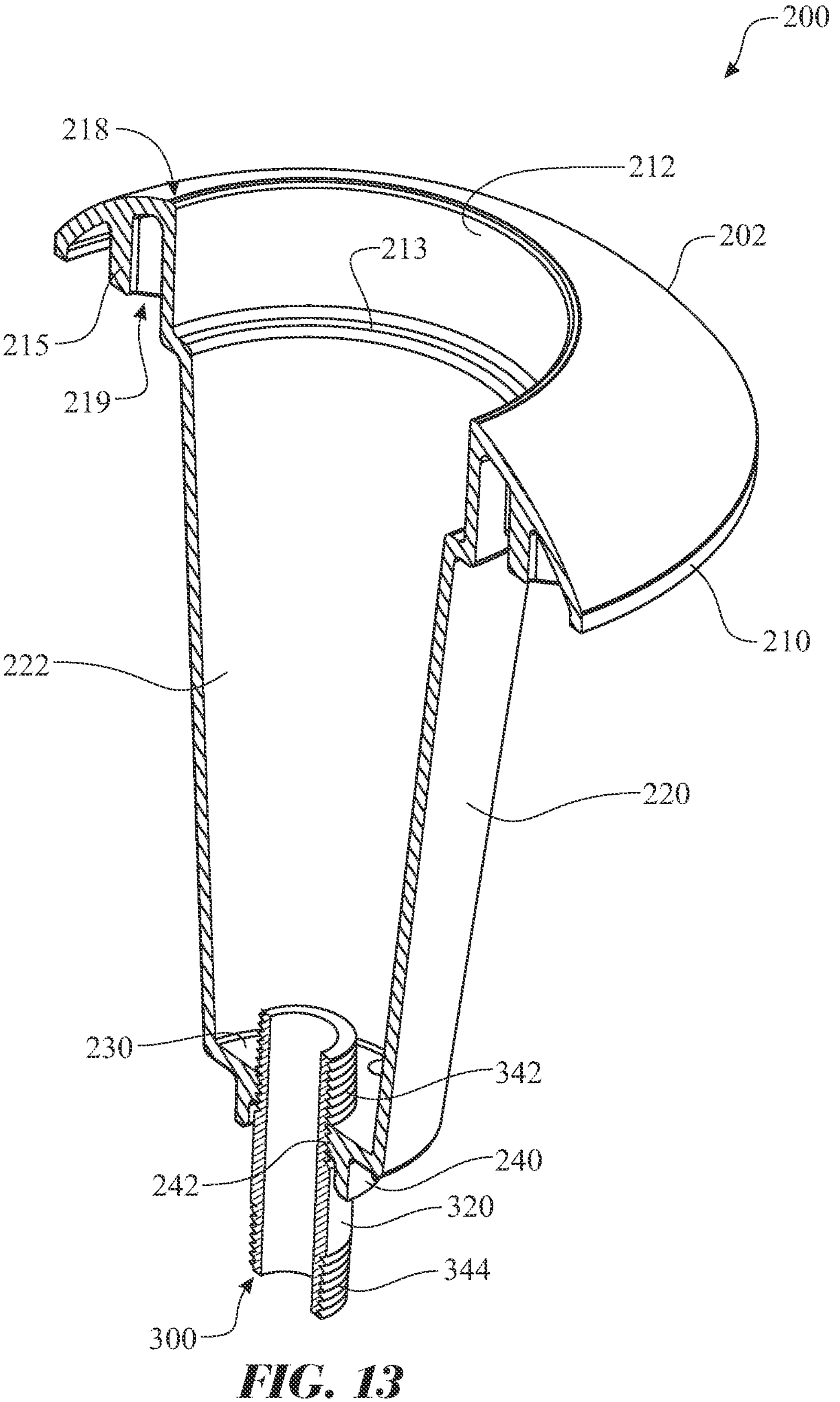
FIG. 13 presents a sectioned isometric top view of a sprinkler riser assembled to the body of the sprinkler head serviceability enhancing assembly originally introduced in FIG. 9, the section being taken along a longitudinal central axis.
Figure 14:
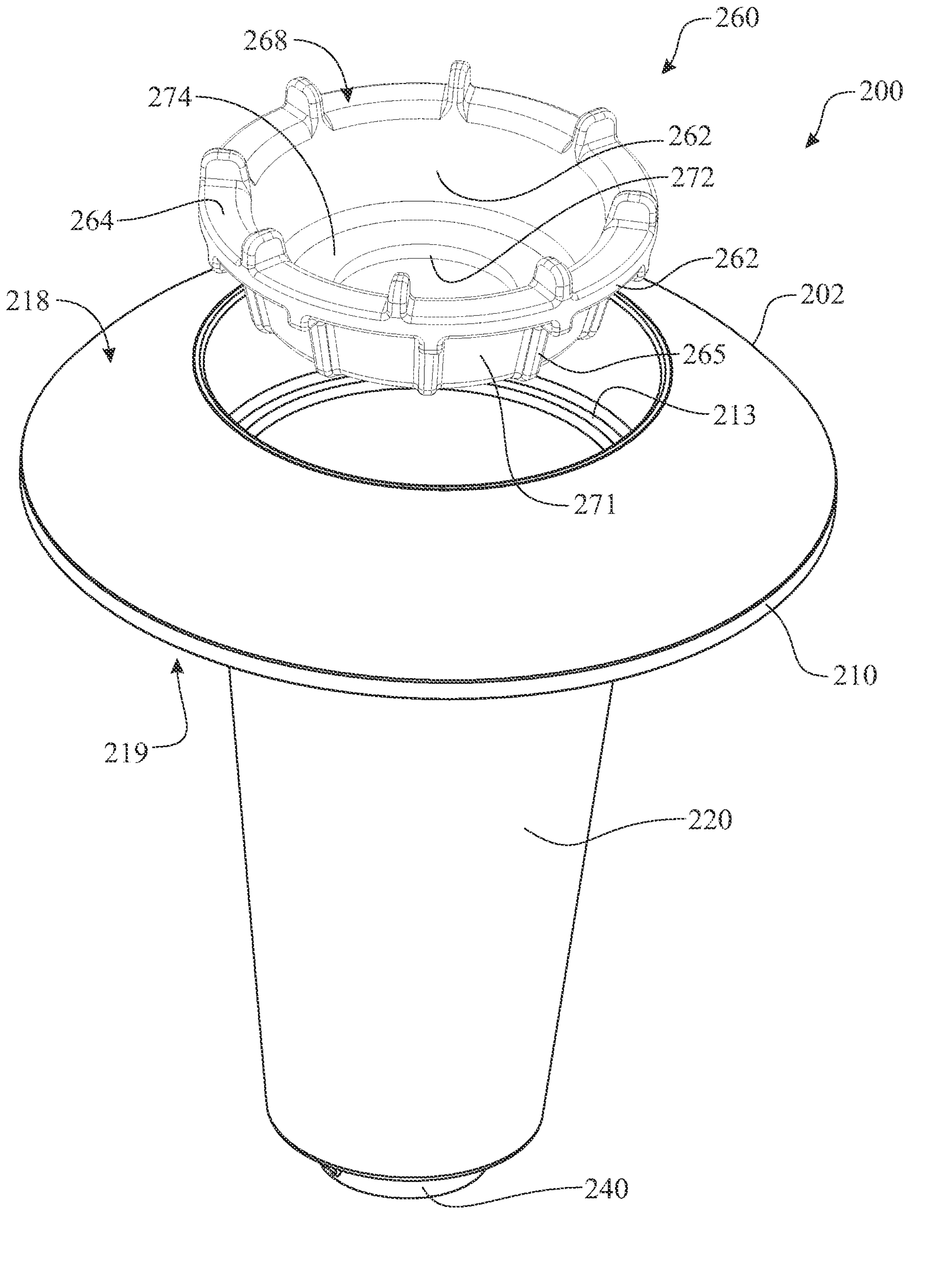
FIG. 14 presents an exploded assembly isometric top view of an insert being assembled to the sprinkler head serviceability enhancing assembly originally introduced in FIG. 9.

The sealing insert 160 in combination with the body 102 are designed to locate a top surface of an in-ground sprinkler head 410 of the in-ground sprinkler assembly 400 at or below an upper surface of the flange 110, as illustrated in FIG. 8. The in-ground sprinkler head 410 can rest on the seal insert upper surface 164 of the sealing insert 160 (as illustrated in FIG. 8), against the seal insert upper segment interior surface 162 of the sealing insert 160, or against the insert upper segment sprinkler sealing surface 163 of the sealing insert 160. The seal insert upper segment interior surface 162 can be cylindrical in shape or frustum shaped. A cylindrically shaped seal insert upper segment interior surface 162 enables an in-ground sprinkler head bottom surface 413 of the in-ground sprinkler head 410 to rest against the insert upper segment sprinkler scaling surface 163 of the sealing insert 160. The frustum shape enables a sidewall of the in-ground sprinkler head 410 to rest against the seal insert upper segment interior surface 162 or the insert upper segment sprinkler sealing surface 163. This enables adaptation to a variety of in-ground sprinkler assemblies 400, each different in-ground sprinkler assembly 400 having an in-ground sprinkler head 410 having different height and/or diameter.

The seal insert upper segment 161 is designed having a height that when seated within the upper body segment interior surface 112 of the in-ground sprinkler assembly serviceability enhancing apparatus body 102, the uppermost surface of the in-ground sprinkler head 410 remains parallel to or below the uppermost portion of the flange 110. The design would consider a number of in-ground sprinkler assemblies 400 having different sizes and shapes. A seal insert lower segment interior surface 172 would be of a diameter to accommodate the largest diameter of an in-ground sprinkler body 420 of the number of in-ground sprinkler assemblies 400 considered during the design process. The in-ground sprinkler body 420 is a cylindrical body commonly housing operating mechanisms for a pop up sprinkler head (in-ground sprinkler operational components 422) (not detailed in the illustration, but well known by those skilled in the art).

In use, a threaded sprinkler head riser 300 would be installed to the body coupling segment 140. The threaded sprinkler head riser 300 commonly includes a threaded sprinkler head riser body first coupling end 342 located at a first end of a threaded sprinkler head riser body 320 and a threaded sprinkler head riser body second coupling end 344 located at a second, opposite end of the threaded sprinkler head riser body 320. The threaded sprinkler head riser 300 is tubular in shape, having a threaded sprinkler head riser body interior surface 322. In the exemplary illustration, the threaded sprinkler head riser body first coupling end 342 and the threaded sprinkler head riser body second coupling end 344 are each male threaded couples, such as a ½-in MNPT or a ¾-in MNPT. The threaded sprinkler head riser 300 can be of any commercially available threaded sprinkler head riser 300, including a fixed length or a cut off riser (sizeable). The threaded sprinkler head riser 300 can be a rigid design or a flexible design. The threaded sprinkler head riser 300 are commonly available in the following configurations: a ½-in MNPT×½-in MNPT (male/male), a ½-in MNPT×½-in MNPT (male/female), a ¾-in MNPT×¾-in MNPT (male/male), and a ¾-in MNPT×¾-in MNPT (male/female). The threaded sprinkler head riser 300 can include a threaded sprinkler head riser body 320 having a cylindrically shaped exterior surface, a square shaped exterior surface, a hexagonally shaped exterior surface, or any other suitably shaped exterior surface. The threaded sprinkler head riser 300 would be selected to mate with the body coupling segment coupling feature 142 of the in-ground sprinkler assembly serviceability enhancing apparatus body 102.

The threaded sprinkler head riser body first coupling end 342 of the threaded sprinkler head riser 300 is assembled to the body coupling segment threading 142 of the body coupling segment 140 of the in-ground sprinkler assembly serviceability enhancing apparatus body 102. The body coupling segment 140 is preferably designed enabling the threaded sprinkler head riser body first coupling end 342 to extend outward from an upper edge of the body coupling segment 140. A length of the threaded sprinkler head riser body first coupling end 342 that is exposed is then coupled with the in-ground sprinkler joining feature threading 442 provided by the in-ground sprinkler joining feature 440 of the in-ground sprinkler assembly 400, as illustrated in FIG. 8.

Some threaded sprinkler head risers 300 are fabricated including a hexagonal feature (not shown) to aid in assembly and disassembly from a mating component. An interior diameter of the body coupling segment 140 (prior to the threaded segment) would be slightly larger than a point to point (widest) dimension of the hexagonal feature of the threaded sprinkler head riser 300, enabling the hexagonal feature to pass into the interior void defined by the interior diameter of the body coupling segment 140.

In an alternate arrangement, the body coupling segment 140 can include a coupling feature 142 for coupling with the threaded sprinkler head riser body first coupling end 342 of the threaded sprinkler head riser 300 and a second coupling feature for coupling with the in-ground sprinkler joining or coupling feature 442 of the in-ground sprinkler joining feature 440 of the in-ground sprinkler assembly 400. For example, an upper end of the body coupling segment 140 can include a female coupling for receiving a second threaded sprinkler head riser 300 for indirectly coupling to the in-ground sprinkler joining feature 440 of the in-ground sprinkler assembly 400 or a male coupling for directly coupling to the in-ground sprinkler joining feature 440 of the in-ground sprinkler assembly 400.

In use, the threaded sprinkler head riser body second coupling end 344 of the threaded sprinkler head riser 300 would be coupled to an in-ground plumbing for a sprinkler system. The threaded sprinkler head riser body first coupling end 342 of the threaded sprinkler head riser 300 would be coupled to the body coupling segment 140 of the in-ground sprinkler assembly serviceability enhancing apparatus body 102. The in-ground sprinkler assembly 400 would be inserted through the seal insert lower segment interior surface 172 of the sealing insert 160, seating the in-ground sprinkler head bottom surface 413 of the in-ground sprinkler head 410 against a surface of the sealing insert 160, such as the seal insert upper surface 164, the seal insert upper segment interior surface 162, and/or the insert upper segment sprinkler sealing surface 163. The subassembly comprising the in-ground sprinkler assembly 400 inserted through the sealing insert 160 is placed within the interior void of the in-ground sprinkler assembly serviceability enhancing apparatus body sidewall 220 and coupled to the threaded sprinkler head riser body first coupling end 342. This arrangement protects the in-ground sprinkler assembly 400 from the elements or traffic (animal, human, machinery, and the like) during use. The in-ground sprinkler assembly serviceability enhancing apparatus 100 additionally improves serviceability of the in-ground sprinkler assembly 400. The body sidewall 120 of the body 102 provides a cavity which cases removal and reinstallation of the in-ground sprinkler assembly 400 within the interior of the in-ground sprinkler assembly serviceability enhancing apparatus body 102. The casing is a result of an elimination of removal of surrounding dirt, roots, rocks, and the like that are common in an arrangement where the in-ground sprinkler assembly 400 is directly installed into the ground. The introduction of the in-ground sprinkler assembly serviceability enhancing apparatus 100 protects the in-ground sprinkler assembly 400 while installed, thus reducing the need for servicing, and when servicing is required, the in-ground sprinkler assembly serviceability enhancing apparatus 100 reduces time required for servicing an in-ground sprinkler assembly 400.

In addition to protection and serviceability, a combination of the body sidewall 120 of the body 102 and the flange 110 provides stability to the in-ground sprinkler assembly serviceability enhancing apparatus 100, maintaining the in-ground sprinkler assembly 400 in a vertical orientation. Soil surrounding the body sidewall 120 provides a portion of the support and soil underneath the flange 110 provides additional support. The combination of the body sidewall 120 and the flange 110 creates a moment that significantly limits any deviation from an installed orientation over time, where the in-ground sprinkler assembly serviceability enhancing apparatus 100 would be subjected to weather and abuse from lawn servicing. Over time, packing of the soil surrounding the in-ground sprinkler assembly serviceability enhancing apparatus 100 increases in density, thus increasing the support and stability provided to the in-ground sprinkler assembly serviceability enhancing apparatus 100.

The in-ground sprinkler assembly serviceability enhancing apparatus 100 illustrated in FIGS. 1-8 present a first version of the assembly. A second version of the assembly, referred to as an in-ground sprinkler assembly serviceability enhancing apparatus 200, is introduced and detailed in FIGS. 9-21. The in-ground sprinkler assembly serviceability enhancing apparatus 200 is a variant of the in-ground sprinkler assembly serviceability enhancing apparatus 100 with the changes being detailed herein. The in-ground sprinkler assembly serviceability enhancing apparatus 200 and the in-ground sprinkler assembly serviceability enhancing apparatus 100 have a large number of like elements. Like elements are numbered the same, wherein the elements associated with the in-ground sprinkler assembly serviceability enhancing apparatus 100 are preceded by the numeral "1" with like elements associated with the in-ground sprinkler assembly serviceability enhancing apparatus 200 are preceded by the numeral "2".

The reinforcement arrangement for the flange 110 utilizes a series of radially arranged in-ground sprinkler assembly serviceability enhancing apparatus upper flange inner radial reinforcement structures 214. The reinforcement arrangement for an in-ground sprinkler assembly serviceability enhancing apparatus flange 210 of an in-ground sprinkler assembly serviceability enhancing apparatus body 202 is an enhancement compared to the reinforcement arrangement of the flange 110. The reinforcement arrangement for an flange 210 include an in-ground sprinkler assembly serviceability enhancing apparatus flange annular reinforcement structure 215, wherein the flange annular reinforcement structure 215 is located between an in-ground sprinkler assembly serviceability enhancing apparatus body upper annular segment 211 and an outer edge of the flange 210. The reinforcement arrangement for the flange 210 additionally includes a plurality of in-ground sprinkler assembly serviceability enhancing apparatus flange inner radial reinforcement structure 214 extending between the body upper annular segment 211 and the flange annular reinforcement structure 215 and a plurality of in-ground sprinkler assembly serviceability enhancing apparatus flange outer radial reinforcement structure 216 extending between the flange annular reinforcement structure 215 and the outer edge of the flange 210. Each of the in-ground sprinkler assembly serviceability enhancing apparatus upper flange inner radial reinforcement structures 214 and the in-ground sprinkler assembly serviceability enhancing apparatus upper flange outer radial reinforcement structures 216 are arranged extending somewhat radially or at an angle from radially.

Figure 15:
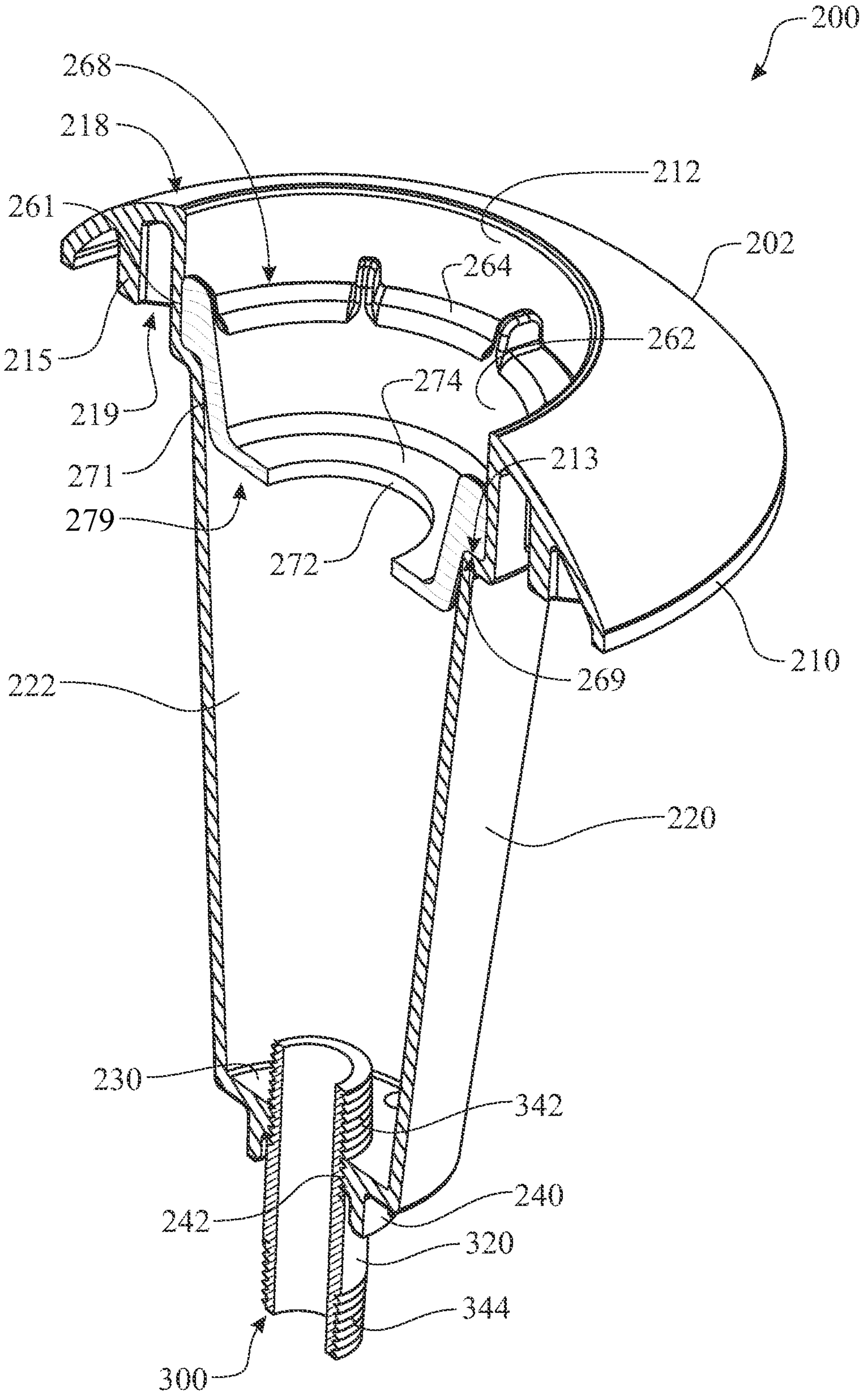
FIG. 15 presents a sectioned isometric top view of the insert and the sprinkler riser assembled to the body of the sprinkler head serviceability enhancing assembly originally introduced in FIG. 9 illustrating the assembly of one another, the section being taken along a longitudinal central axis.

An in-ground sprinkler assembly serviceability enhancing apparatus seal insert top 268 is fabricated of a pliant material, such as rubber, silicone, foam, and the like. The seal insert top 268 includes an in-ground sprinkler assembly serviceability enhancing apparatus seal insert upper segment 261 and an in-ground sprinkler assembly serviceability enhancing apparatus seal insert lower segment 271 extending between an in-ground sprinkler assembly serviceability enhancing apparatus seal insert upper surface 264 and an in-ground sprinkler assembly serviceability enhancing apparatus seal insert bottom wall 274. An in-ground sprinkler assembly serviceability enhancing apparatus seal insert upper segment base sealing surface 269 is formed on an exterior surface of the in-ground sprinkler assembly serviceability enhancing apparatus seal insert 260, where the seal insert upper segment base sealing surface 269 provides a transition between the exterior of the seal insert upper segment 261 and the exterior of the seal insert lower segment 271. The seal insert upper segment base sealing surface 269 is of a size and shape to be adequately supported by an in-ground sprinkler assembly serviceability enhancing apparatus upper body sealing surface 213 of the body 202. The seal insert upper segment base scaling surface 269 can also provide a seal against the upper body scaling surface 213 to minimize intrusion of moisture or other debris into the interior void within the body sidewall 220. The seal insert top 268 is formed defining an in-ground sprinkler assembly serviceability enhancing apparatus seal insert upper segment interior surface 262 having a frustum shape extending between the seal insert upper surface 264 and the seal insert bottom wall 274. The seal insert top 268 preferably is formed having a horizontal surface designed to engage with the upper body scaling surface 213 of the body 202, as illustrated in FIG. 15. At least one in-ground sprinkler assembly serviceability enhancing apparatus seal insert reinforcement 265 can be integrated into the seal insert 260, where each at least one seal insert reinforcement 265 is designed to reinforce the seal insert 260. The seal insert top 268 includes the seal insert bottom wall 274 located at a lower end. The seal insert bottom wall 274 is a thinner wall, thus enabling flexibility, while sufficiently thick enough to support the in-ground sprinkler head 410 of the in-ground sprinkler assembly 400. The flexibility of the seal insert bottom wall 274 accommodates a variety of in-ground sprinkler assemblies 400 having a broader spectrum of diameters of in-ground sprinkler bodies 420.

Figure 16:
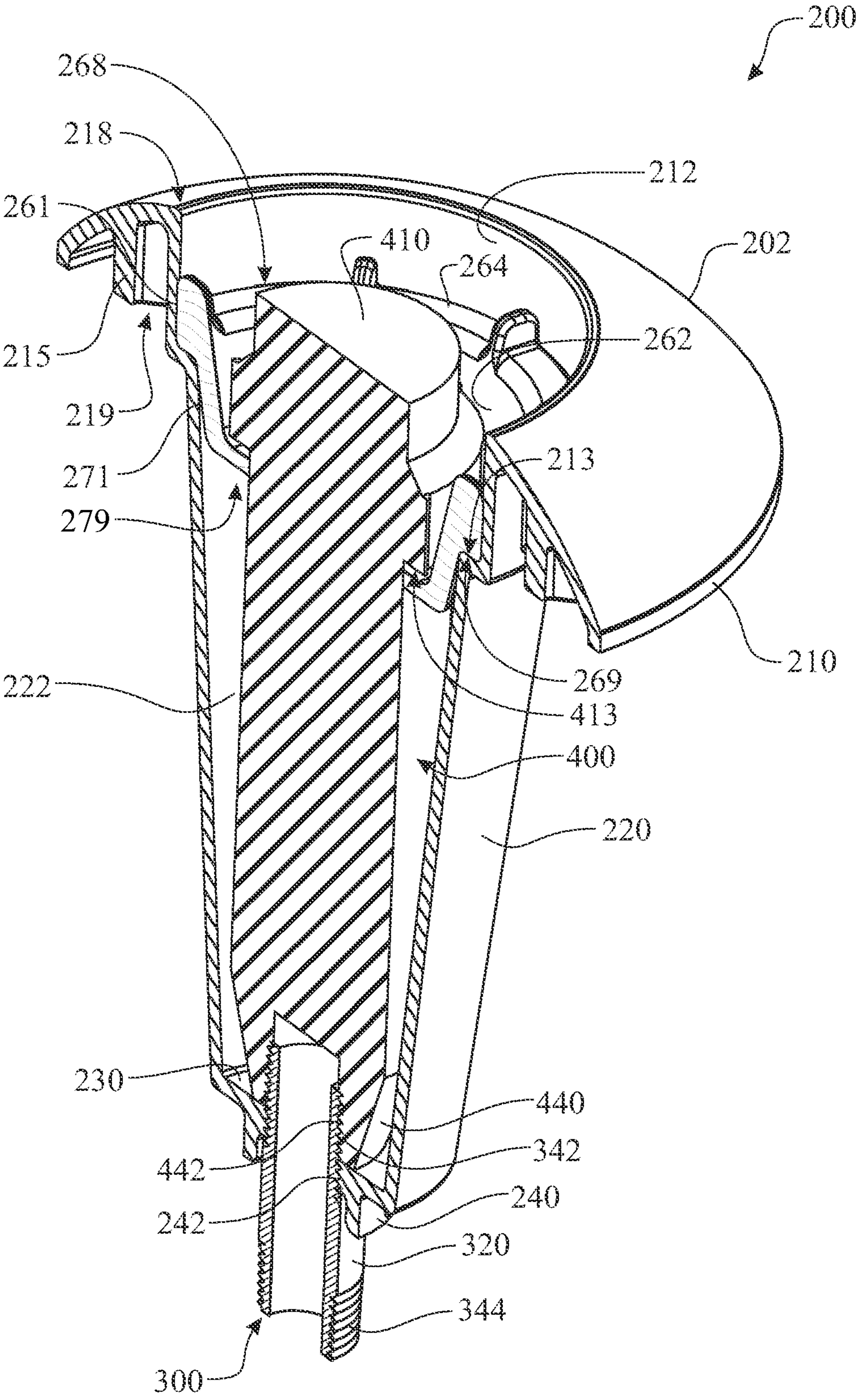
FIG. 16 presents a sectioned isometric top view of a first exemplary sprinkler head assembly, the insert, and the sprinkler riser assembled to the body of the sprinkler head serviceability enhancing assembly originally introduced in FIG. 9 illustrating the assembly of one another, the section being taken along a longitudinal central axis.
Figure 17:
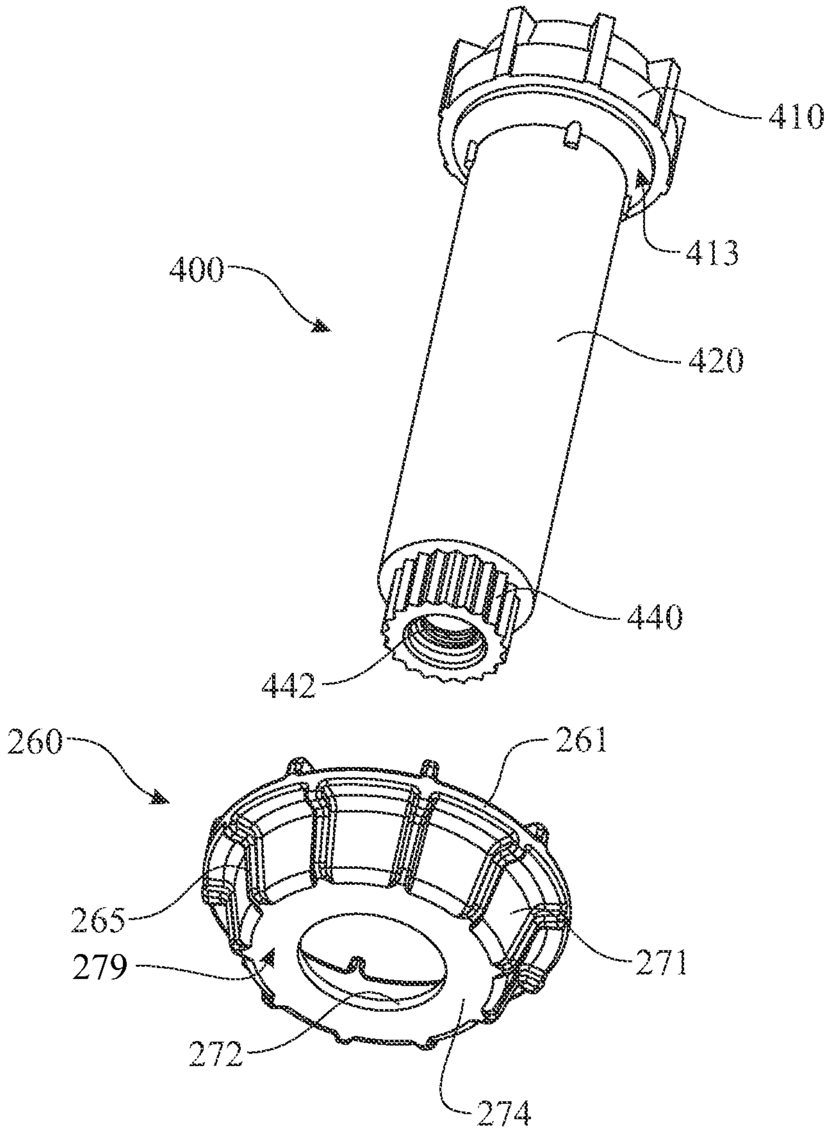
FIG. 17 presents a exploded assembly isometric bottom view of the insert being assembled to the first exemplary sprinkler head assembly.
Figure 18:
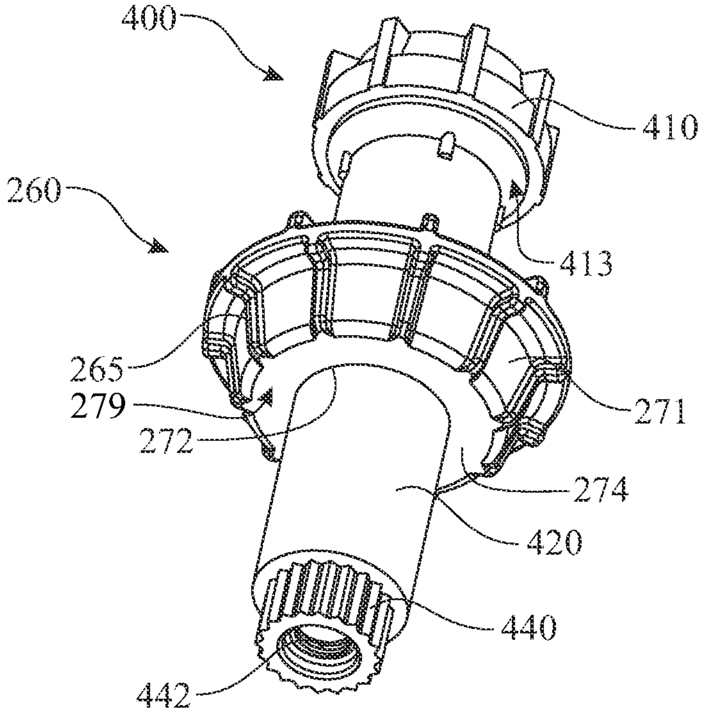
FIG. 18 presents an isometric bottom view of the insert partially assembled to the first exemplary sprinkler head assembly.
Figure 19:
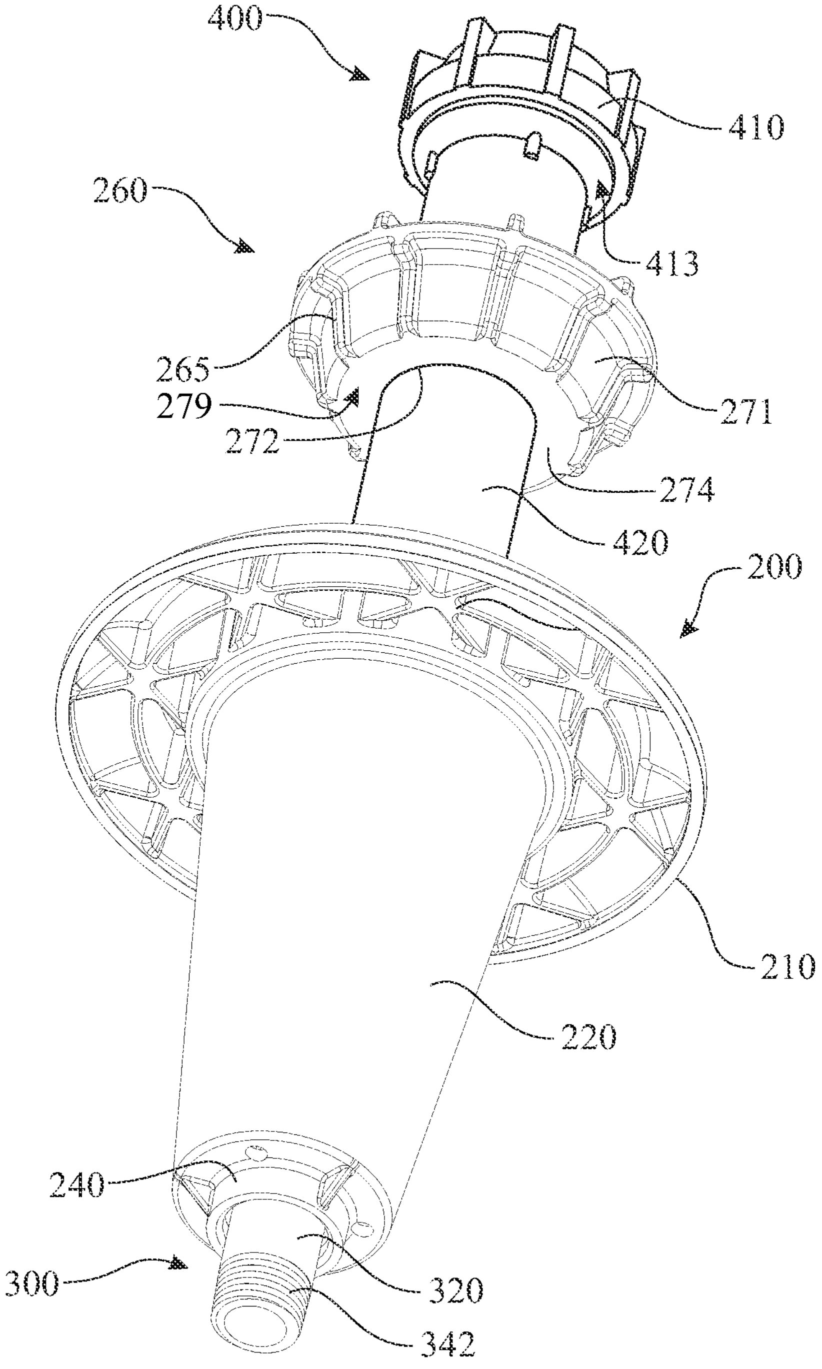
FIG. 19 presents an isometric bottom view of the subassembly comprising the insert and the first exemplary sprinkler head assembly being assembled to the body of the sprinkler head serviceability enhancing assembly.
Figure 20:
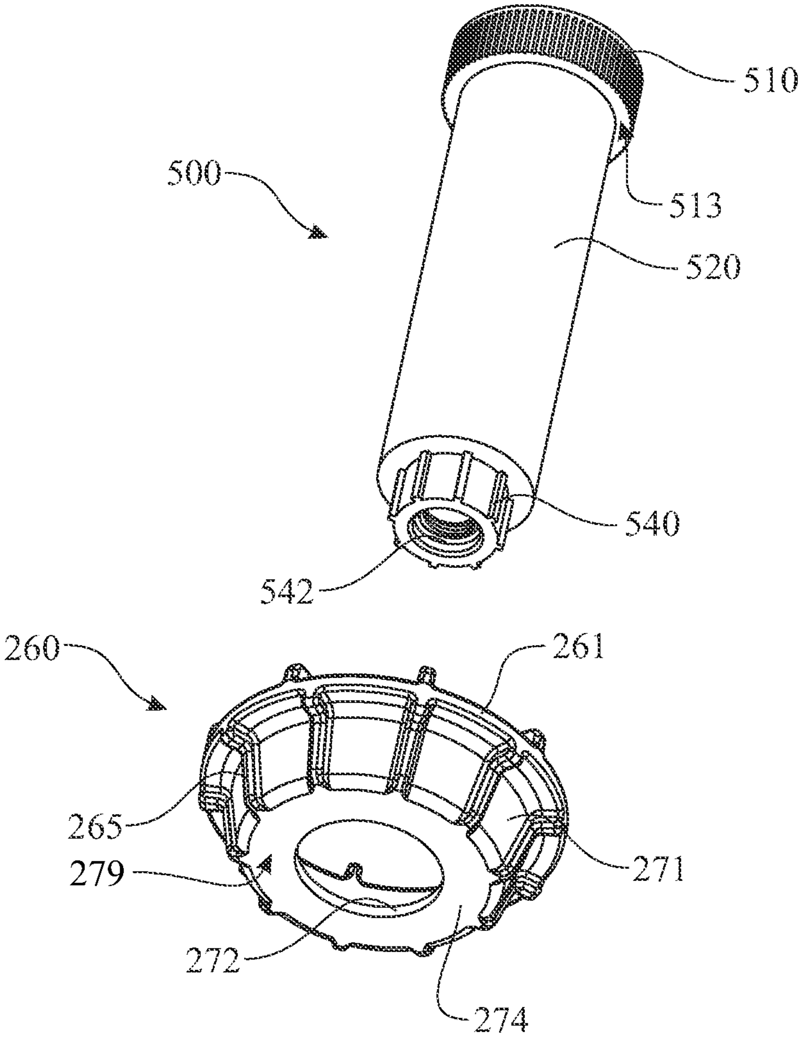
FIG. 20 presents a exploded assembly isometric bottom view of the insert being assembled to the first exemplary sprinkler head assembly.

During installation, the threaded sprinkler head riser 300 is assembled to an in-ground sprinkler assembly serviceability enhancing apparatus coupling segment 240 of the body 202 using the provided coupling features. The assembly of the threaded sprinkler head riser 300 to the body 202 is accomplished in a same manner as the assembly of the threaded sprinkler head riser 300 to the body 102 described above. In the exemplary illustrations, the coupling features are a male threaded section and a female threaded section. Although the exemplary illustrations present a threaded interface as the coupling features, it is understood that any suitable coupling feature can be utilized, including a quick connect, a twist and lock, a cam interface, or any other suitable coupling design. The process includes a step of inserting an in-ground sprinkler body 420 of the in-ground sprinkler assembly 400 through the in-ground sprinkler assembly serviceability enhancing apparatus seal insert lower segment interior surface 272 of the 260, as illustrated in FIGS. 17 and 18. The assembly process may include a step of determining which seal insert 260 of a series of in-ground sprinkler assembly serviceability enhancing apparatus inserts 260 are appropriate for the selected in-ground sprinkler assembly 400. The in-ground sprinkler body 420 is inserted through the seal insert lower segment interior surface 272 of the seal insert 260 until an in-ground sprinkler head bottom surface 413 of the in-ground sprinkler head 410 of the in-ground sprinkler assembly 400 is seated against an upper surface of the seal insert bottom wall 274, as illustrated in FIG. 16. An in-ground sprinkler joining feature 440 of the in-ground sprinkler assembly 400 is coupled to the coupling segment, such as by threadably coupling the threaded sprinkler head riser body first coupling end 342 of the threaded sprinkler head riser 300 and an in-ground sprinkler joining feature threading 442 formed within an interior surface of the in-ground sprinkler joining feature 440 of the in-ground sprinkler assembly 400, as illustrated in FIG. 16. When assembled, the in-ground sprinkler head 410 resides at least partially within an interior cavity defined by the in-ground sprinkler assembly serviceability enhancing apparatus insert upper segment interior surface 262 of the seal insert 260. The designs of each of the body 202 and the seal insert 260 are such that the uppermost surface of the in-ground sprinkler head 410 is located level with or below an uppermost surface of the flange 210. The in-ground sprinkler assembly serviceability enhancing apparatus 200 is inserted into a dug hole and the threaded sprinkler head riser 300 is then coupled to the plumbing of a sprinkler system. Once coupled, the hole is filled with dirt.

Figure 21:
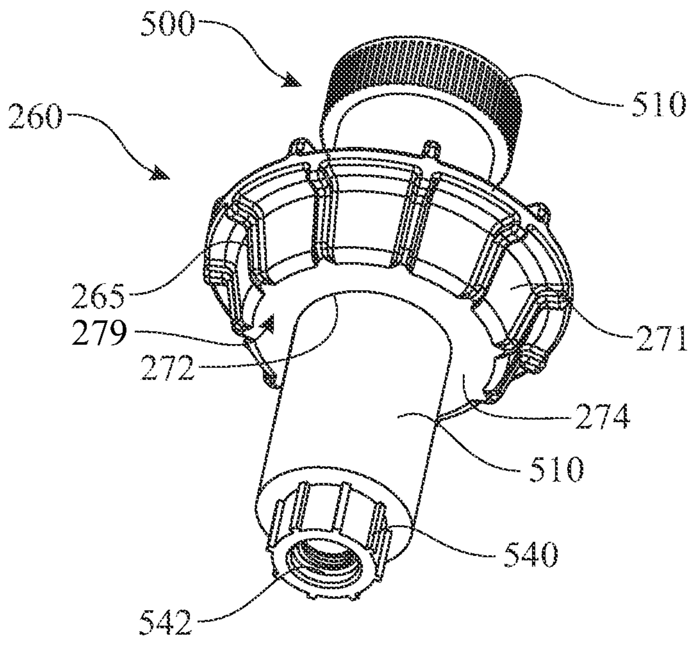
FIG. 21 presents an isometric bottom view of the insert partially assembled to the first exemplary sprinkler head assembly.

The in-ground sprinkler assembly serviceability enhancing apparatus 100 and the in-ground sprinkler assembly serviceability enhancing apparatus 200 are adaptable to different sprinkler head designs, sizes and shapes. Using the in-ground sprinkler assembly serviceability enhancing apparatus 200 as an example, an in-ground sprinkler assembly 500 (introduced in FIG. 20) differs in design, size, and shape from the in-ground sprinkler assembly 400. The in-ground sprinkler assembly 500 and the in-ground sprinkler assembly 400 differ in design, but include like elements. Like elements are numbered the same, wherein the elements associated with the in-ground sprinkler assembly 400 are preceded by the numeral "4" with like elements associated with the in-ground sprinkler assembly 500 are preceded by the numeral "5". A diameter of the in-ground sprinkler body 420 differs from a diameter of an in-ground sprinkler body 520. The seal insert 260 is fabricated of a pliant material enabling insertion of the in-ground sprinkler body 520 through the seal insert lower segment interior surface 272 of the seal insert 260, as illustrated in FIG. 21.

Figure 22:
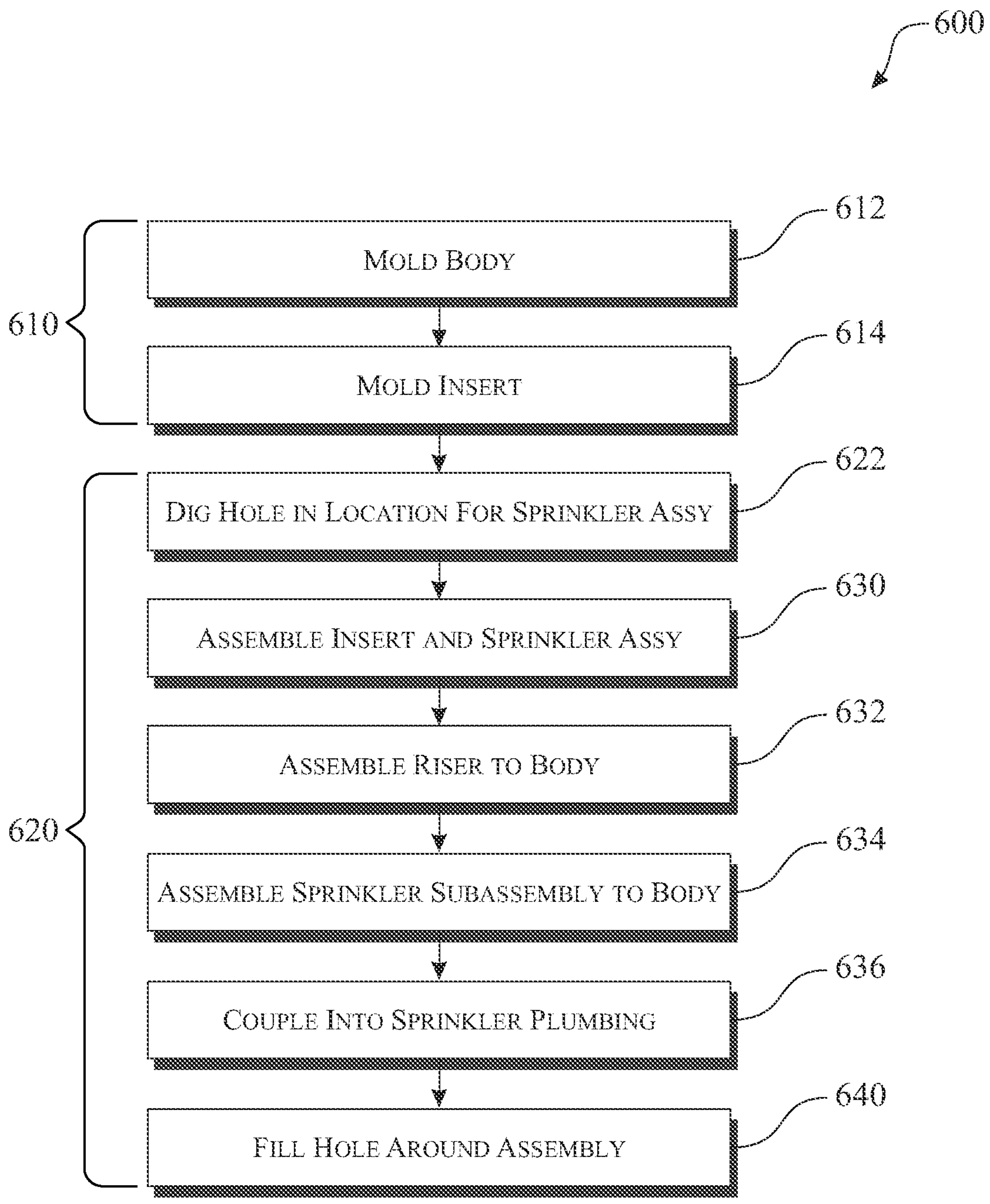
FIG. 22 presents a flow diagram of an exemplary method of installation of the sprinkler head serviceability enhancing assembly.

An in-ground sprinkler assembly serviceability enhancing apparatus fabrication and installation flow diagram 600 is presented in FIG. 22. The in-ground sprinkler assembly serviceability enhancing apparatus fabrication and installation flow diagram 600 includes each of an in-ground sprinkler assembly serviceability enhancing apparatus fabrication flow diagram 610 and an in-ground sprinkler assembly serviceability enhancing apparatus assembly and installation flow diagram 620. The in-ground sprinkler assembly serviceability enhancing apparatus fabrication flow diagram 610 comprising a step of molding the in-ground sprinkler assembly serviceability enhancing apparatus body 102, 202 (block 612) and a step of molding the sealing insert 160, 260 (block 614). The step of molding the body 102 is accomplished by any known molding process, including injection molding of a rigid or semi-rigid material, including plastic, polyethylene, polypropylene, polyvinyl chloride (colloquial: polyvinyl, vinyl; abbreviated: PVC), metal, and the like. The step of molding the sealing insert 160 is accomplished by any known molding process, including injection molding of a pliant material, including foam, rubber, silicone, pliant plastics, elastomeric materials, pliable synthetic polymers, and the like. Although a preferred fabricated process is molding, it is understood that other fabrication process can be used, including three-dimensional printing, machining, or any other suitable fabrication process.

The in-ground sprinkler assembly serviceability enhancing apparatus assembly and installation flow diagram 620 includes a series of steps which can be accomplished in any reasonable order. A hole is dug for receiving the in-ground sprinkler assembly serviceability enhancing apparatus body 102, 202 (block 622). The process of digging the hole can vary, including use of manual equipment or automated equipment. The hole would be slightly larger than a diameter of the in-ground sprinkler assembly serviceability enhancing apparatus body 102, 202. The hole can be dug during installation of the irrigation plumbing (such as during an initial installation or a modification to an existing irrigation system) or during a process of repairing or replacing an in-ground sprinkler assembly 400. In an initial installation, trenches are dug and an irrigation piping water distribution system is laid into the trenches. The irrigation piping water distribution system includes a section of vertically arranged piping located at each sprinkler location.

The in-ground sprinkler assembly 400, 500 is inserted through the seal insert lower segment interior surface 172, 272 of the sealing insert 160, 260 (block 630) to create a sprinkler head subassembly. The properties of the pliant material of the sealing insert 160, 260 enable stretching and conforming to the in-ground sprinkler body 420, 520 of the in-ground sprinkler assembly 400, 500.

The threaded sprinkler head riser 300 is assembled to the body coupling segment 140, 240 of the in-ground sprinkler assembly serviceability enhancing apparatus body 102, 202 in accordance with an assembly process respective to a type of coupling features of the threaded sprinkler head riser 300 and the body coupling segment 140, 240 (block 632). In the exemplary illustrations, the coupling feature is a threaded interface. Other coupling features, as previously described can be used.

The sprinkler subassembly is inserted and assembled to the in-ground sprinkler assembly serviceability enhancing apparatus body 102, 202 (block 634). The step of assembling the sprinkler subassembly to the in-ground sprinkler assembly serviceability enhancing apparatus body 102, 202 is completed by coupling the in-ground sprinkler joining feature 440, 540 to the threaded sprinkler head riser body first coupling end 342 or other coupling feature assembled to or integral with the body coupling segment 140, 240 of the in-ground sprinkler assembly serviceability enhancing apparatus body 102, 202. The in-ground sprinkler assembly serviceability enhancing apparatus 100, 200 is then placed within the dug hole and installed by coupling the threaded sprinkler head riser 300 to the irrigation system plumbing (block 636). This step is accomplished in accordance with the assembly method associated with the type of coupling feature.

Once the in-ground sprinkler assembly serviceability enhancing apparatus 100, 200 is assembled to the irrigation system plumbing, the hole can be filled in using the previously removed dirt, new material, or any other suitable material (step 640). Servicing of the in-ground sprinkler assembly 400, 500 is accomplished by separating the coupling between the in-ground sprinkler joining feature 440, 540 of the in-ground sprinkler assembly 400, 500 and the coupling feature of the body coupling segment 140, 240. The in-ground sprinkler assembly serviceability enhancing apparatus 100, 200 eliminates a step of removing grass or other landscaping and dirt from surroundings of the in-ground sprinkler assembly 400, 500.

In one alternative assembly process, the sealing insert 160, 260 can be inserted into the in-ground sprinkler assembly serviceability enhancing apparatus body 102, 202 of the in-ground sprinkler assembly serviceability enhancing apparatus 100, 200. The in-ground sprinkler assembly 400, 500 would then, subsequently, be inserted through the central aperture of the sealing insert 160, 260 and coupled to the threaded sprinkler head riser body first coupling end 342 of the threaded sprinkler head riser 300 as described above. The upper portion of the sealing insert 160, 260 would be designed to provide clearance for the user to adequately grip an upper region of the in-ground sprinkler assembly 400, 500. The clearance allows an installer to adequately access and grip the upper region of the in-ground sprinkler assembly 400, 500 to properly control and install the in-ground sprinkler assembly 400, 500.

In another alternative assembly process, the in-ground sprinkler assembly 400, 500 is inserted into the in-ground sprinkler assembly serviceability enhancing apparatus body 102, 202 and coupled to the coupling feature associated with the body coupling segment 140, 240 of the in-ground sprinkler assembly serviceability enhancing apparatus body 102, 202. In the exemplary illustration, the in-ground sprinkler joining feature 440, 540 of the in-ground sprinkler assembly 400, 500 is threadably assembled to the exposed portion of the threaded sprinkler head riser body first coupling end 342 of the threaded sprinkler head riser 300 until the threading is frictionally limited or until the base of the in-ground sprinkler assembly 400, 500 seats against the upper or interior surface of the body bottom wall 130, 230 of the in-ground sprinkler assembly serviceability enhancing apparatus body 102, 202 of the in-ground sprinkler assembly serviceability enhancing apparatus 100, 200. Once the in-ground sprinkler assembly 400, 500 is properly seated, the sealing insert 160, 260 is stretched and placed over the upper portion of the in-ground sprinkler assembly 400, 500. The sealing insert 160, 260 is slid downward until the sealing insert 160, 260 is properly seated within the in-ground sprinkler assembly serviceability enhancing apparatus body 102, 202 of the in-ground sprinkler assembly serviceability enhancing apparatus 100, 200. The pliant nature of the material of the sealing insert 160, 260 conforms to the periphery of the in-ground sprinkler assembly 400, 500 creating a seal therebetween. Additionally, the seal insert upper segment 161, 261 and/or the seal insert lower segment 171, 271 of the sealing insert 160, 260 conforms to the upper body segment interior surface 112, 212 and/or the body sidewall interior surface 122, 222, respectively, creating a seal therebetween.

While in use, the upper surface of the flange section deflects moisture and debris away from the center of the in-ground sprinkler assembly serviceability enhancing apparatus 100, 200. The in-ground sprinkler assembly serviceability enhancing apparatus 100, 200 enables easy serviceability (removal and insertion) of the in-ground sprinkler assembly 400, 500 from within the in-ground sprinkler assembly serviceability enhancing apparatus 100, 200. The sprinkler serviceability enhancing apparatus keeps dirt and other inhibitors away from the sprinkler head assembly, thus facilitating the service of the sprinkler head assembly. Additionally, the sprinkler serviceability enhancing apparatus protects the sprinkler heads assembly from unwarranted damage. Any debris collected by the seal insert is removed when the seal insert is drawn out of the body.

The Applicants have provided a method and apparatus, with several options, for creating and using said sprinkler head serviceability apparatus. Although the apparatus and methods taught herein are the preferred and alternate embodiments, it can be recognized that other form factors, materials, and methods of achieving the same results can be contrived from the disclosed teachings.

REFERENCE NUMERAL DESCRIPTION LIST

Ref No. Description

100 in-ground sprinkler assembly serviceability enhancing apparatus
102 body
110 flange
111 upper annular segment (upper body segment)
112 upper body segment interior surface
113 upper body sealing surface
114 flange reinforcement structure
118 flange upper surface
119 flange lower surface
120 body sidewall (lower annular segment)
122 body sidewall interior surface (lower annular segment interior surface)
130 body bottom wall
132 body weep hole or drain passage
134 body bottom reinforcement structure
140 body coupling segment
142 body coupling formation (threading)
160 in-ground sprinkler assembly serviceability enhancing apparatus sealing insert (sealing insert)
161 sealing insert upper segment
162 sealing insert upper segment interior surface
163 sealing insert upper segment sprinkler sealing surface
164 sealing insert upper surface
168 sealing insert top
169 sealing insert upper segment base sealing surface
171 sealing insert lower segment
172 sealing insert lower segment interior surface
174 sealing insert lower surface
179 sealing apparatus insert bottom
200 in-ground sprinkler assembly serviceability enhancing apparatus
202 body
210 flange
211 upper annular segment (upper body segment)
212 upper body segment interior surface

213 upper body sealing surface
214 flange inner radial reinforcement structure
215 flange annular reinforcement structure
216 flange outer radial reinforcement structure
218 flange upper surface
219 flange lower surface
220 body sidewall
222 body sidewall interior surface
230 body bottom wall
232 body weep hole or drain passage
234 body bottom reinforcement structure
240 body coupling segment
242 body coupling formation (threading)
260 in-ground sprinkler assembly serviceability enhancing apparatus sealing insert (sealing insert)
261 sealing insert upper segment
262 sealing insert upper segment interior surface
264 sealing insert upper surface
265 sealing insert reinforcement
268 sealing insert top
269 sealing insert upper segment base sealing surface
271 sealing insert lower segment
272 sealing insert lower segment interior surface
274 sealing insert bottom wall
279 sealing insert bottom
300 threaded sprinkler head riser
320 threaded sprinkler head riser body
322 threaded sprinkler head riser body interior surface
342 threaded sprinkler head riser body first coupling end
344 threaded sprinkler head riser body second coupling end
400 in-ground sprinkler assembly
410 in-ground sprinkler head
413 in-ground sprinkler head bottom surface
420 in-ground sprinkler body
422 in-ground sprinkler operating mechanism
440 in-ground sprinkler joining feature
442 in-ground sprinkler joining feature threading
500 in-ground sprinkler assembly
510 in-ground sprinkler head
520 in-ground sprinkler body
540 in-ground sprinkler joining feature
542 in-ground sprinkler joining feature threading
600 in-ground sprinkler assembly serviceability enhancing apparatus fabrication and installation flow diagram
610 in-ground sprinkler assembly serviceability enhancing apparatus fabrication flow diagram
612 mold body step
614 mold insert step
620 in-ground sprinkler assembly serviceability enhancing apparatus assembly and installation flow diagram
622 dig hole in location for sprinkler assembly step
630 assemble insert and sprinkler head assembly to one another step
632 assemble sprinkler riser to the body step
634 assemble sprinkler subassembly to the body step
636 couple assembly into sprinkler system plumbing step
640 fill hole surrounding exterior of the in-ground sprinkler assembly serviceability enhancing apparatus step

What is claimed is:

1. A method for enhancing serviceability of a sprinkler assembly, the method comprising steps of:

obtaining a sprinkler serviceability enhancing apparatus, said sprinkler serviceability enhancing apparatus comprising:

a sprinkler serviceability enhancing apparatus body having a tubular sidewall extending between a base section and a flange section, said base section comprising a coupling feature, said flange section extending radially outward from an upper edge of said tubular sidewall, said coupling feature comprising an aperture, and a seal insert fabricated of a material having pliant properties, said seal insert having a top surface, a bottom surface, an exterior surface extending between said top surface and said bottom surface, and an interior surface extending between said top surface and said bottom surface, said exterior surface shaped to sealably mate with an interior surface of said tubular sidewall and said interior surface sized and shaped for passing a cylindrical portion of a sprinkler body of said sprinkler assembly centrally through said seal insert;

creating a cavity within a ground;

placing said sprinkler serviceability enhancing apparatus body into said cavity and inserting a threaded pipe section through said coupling feature;

inserting a cylindrical portion of a sprinkler body of said sprinkler head assembly through a centrally located aperture of said interior surface of said seal insert, the cylindrical portion extending between a sprinkler head bottom surface and a sprinkler joining feature of the sprinkler assembly;

inserting said sprinkler assembly into a interior of said sprinkler serviceability enhancing apparatus body, said sprinkler serviceability enhancing apparatus body interior defined by said generally cylindrically shaped sidewall and said base section;

inserting said seal insert into an upper section of said sprinkler serviceability enhancing apparatus body; and joining said sprinkler joining feature of said sprinkler assembly and said threaded pipe section together;

wherein the cylindrical portion of the sprinkler body remains in a fixed position, maintaining the seal formed between the cylindrical portion of the sprinkler body and the seal insert during operation of the sprinkler assembly, wherein a sprinkler head of said sprinkler assembly seals against an interior surface of said seal insert, wherein a top surface of said sprinkler head is located level with or below a top surface of said flange section of said sprinkler serviceability enhancing apparatus.

2. The method for enhancing serviceability of the sprinkler head assembly as recited in claim 1, wherein the step of placing said sprinkler serviceability enhancing apparatus body into said cavity includes a step of seating a bottom surface of said flange section against a surface of said ground, wherein said surface defines an upper edge of said cavity.

3. The method for enhancing serviceability of the sprinkler head assembly as recited in claim 1, the method further comprising steps of:

keeping debris from entering said interior of said sprinkler serviceability enhancing apparatus body by creating a seal between an exterior surface of said sprinkler body and said centrally located aperture of said seal insert and creating a seal between an exterior surface of said seal insert and an interior surface of said sprinkler serviceability enhancing apparatus body.

4. The method for enhancing serviceability of the sprinkler head assembly as recited in claim 1, said flange section further comprising a flange body and an arrangement of flange reinforcement structures extending axially from a lower surface of said flange body, wherein the step of placing said sprinkler serviceability enhancing apparatus body into said cavity includes a step of seating a bottom surface of said flange section against a surface of said ground, wherein said surface of said ground defines an upper edge of said cavity, wherein said flange reinforcement structures provide support between said lower surface of said flange body and said surface of said ground.

5. The method for enhancing serviceability of the sprinkler head assembly as recited in claim 1, wherein said coupling feature is a threaded aperture, wherein the step of joining said sprinkler head assembly and said threaded pipe section together is accomplished by threading said threaded pipe section through said threaded aperture of said base section.

6. The method for enhancing serviceability of the sprinkler head assembly as recited in claim 1, said sprinkler serviceability enhancing apparatus body further comprising an upper body sealing surface formed in an interior surface of said tubular sidewall, said seal insert further comprising a seal insert upper segment base sealing surface formed in an exterior surface of said seal insert, the method further comprising a step of:

seating said insert upper segment base sealing surface against said upper body sealing surface.

7. The method for enhancing serviceability of the sprinkler head assembly as recited in claim 1, said seal insert further comprising a seal insert upper segment sprinkler sealing surface formed in an interior surface of said seal insert, the method further comprising a step of:

seating an in-ground sprinkler head bottom surface of a sprinkler head of said sprinkler assembly against said seal insert upper segment sprinkler sealing surface.

8. The method for enhancing serviceability of the sprinkler head assembly as recited in claim 1, said sprinkler serviceability enhancing apparatus body further comprising an upper body sealing surface formed as a radially extending surface in an interior surface of said tubular sidewall, said seal insert further comprising a seal insert upper segment base sealing surface formed as a radially extending surface in an exterior surface of said seal insert, the method further comprising a step of:

seating said insert upper segment base sealing surface against said upper body sealing surface.

9. The method for enhancing serviceability of the sprinkler head assembly as recited in claim 1, said seal insert further comprising a seal insert upper segment interior surface defining a sprinkler head receiving section and a seal insert upper segment sprinkler sealing surface formed in a radially extending flange defining a bottom portion of said sprinkler head receiving section, the method further comprising a step of:

seating an in-ground sprinkler head bottom surface of a sprinkler head of said sprinkler assembly against said seal insert upper segment sprinkler sealing surface.

10. The method for enhancing serviceability of the sprinkler head assembly as recited in claim 1, said seal insert further comprising a seal insert upper segment interior surface defining a sprinkler head receiving section and a seal insert lower segment sprinkler sealing surface formed in a radially extending flange defining a bottom portion of said sprinkler head receiving section, wherein said seal insert upper segment interior surface is sized to accommodate a largest diameter of sprinkler heads of a series of different sized sprinkler assemblies and a diameter of said seal insert lower segment sprinkler sealing surface is sized to accommodate a smallest diameter of sprinkler bodies of said series of different sized sprinkler assemblies, the method further comprising steps of:

adapting said seal insert to accommodate any of said series of different sized sprinkler assemblies by utilizing a thickness and pliant properties of said radially extending flange; and sealing an in-ground sprinkler assembly body sidewall of said sprinkler assembly against a seal insert lower segment interior surface of said seal insert.

11. A method for enhancing serviceability of a sprinkler assembly, the method comprising steps of:

obtaining a sprinkler serviceability enhancing apparatus, said sprinkler serviceability enhancing apparatus comprising:

a sprinkler serviceability enhancing apparatus body having a frustum shaped tubular sidewall extending between a base section and a flange section, said frustum shape comprising a larger diameter proximate said flange section and a smaller diameter proximate said base section, said base section comprising a coupling feature, said flange section extending radially outward from an upper edge of said tubular sidewall, said coupling feature comprising an aperture, and a seal insert fabricated of a material having pliant properties, said seal insert having a top surface, a bottom surface, an exterior surface extending between said top surface and said bottom surface, an interior surface extending between said top surface and said bottom surface, and a seal insert upper segment sprinkler sealing surface formed in a radially extending flange defining a bottom portion of said sprinkler head receiving section, said exterior surface shaped to sealably mate with an interior surface of said tubular sidewall and said interior surface sized and shaped for passing a sprinkler body of said sprinkler assembly centrally through said insert seal, wherein said seal insert upper segment interior surface is sized to accommodate a largest diameter of sprinkler heads of a series of different sized sprinkler assemblies and a diameter of said seal insert lower segment sprinkler sealing surface is sized to accommodate a smallest diameter of sprinkler bodies of said series of different sized sprinkler assemblies;

creating a cavity within a ground;

placing said sprinkler serviceability enhancing apparatus body into said cavity and inserting a threaded pipe section through said coupling feature;

adapting said seal insert to accommodate any of said series of different sized sprinkler assemblies by utilizing a thickness and pliant properties of said radially extending flange;

inserting a sprinkler body of said sprinkler head assembly through a centrally located aperture of said seal insert;

inserting said sprinkler assembly into a interior of said sprinkler serviceability enhancing apparatus body, said sprinkler serviceability enhancing apparatus body interior defined by said generally cylindrically shaped sidewall and said base section;

inserting said seal insert into an upper section of said sprinkler serviceability enhancing apparatus body;

joining said sprinkler assembly and said threaded pipe section together; and sealing an in-ground sprinkler assembly body sidewall of said sprinkler assembly against a seal insert lower segment interior surface of said seal insert;

employing said frustum shape of said body to provide support to said sprinkler serviceability enhancing apparatus, wherein a sprinkler head of said sprinkler assembly seals against an interior surface of said seal insert, wherein a top surface of said sprinkler head is located level with or below a top surface of said flange section of said sprinkler serviceability enhancing apparatus.

12. The method for enhancing serviceability of the sprinkler head assembly as recited in claim 11, wherein the step of placing said sprinkler serviceability enhancing apparatus body into said cavity includes a step of seating a bottom surface of said flange section against a surface of said ground, wherein said surface defines an upper edge of said cavity.

13. The method for enhancing serviceability of the sprinkler head assembly as recited in claim 11, the method further comprising steps of:

keeping debris from entering said interior of said sprinkler serviceability enhancing apparatus body by creating a seal between an exterior surface of said sprinkler body and said centrally located aperture of said seal insert and creating a seal between an exterior surface of said seal insert and an interior surface of said sprinkler serviceability enhancing apparatus body.

14. The method for enhancing serviceability of the sprinkler head assembly as recited in claim 11, said flange section further comprising a flange body and an arrangement of flange reinforcement structures extending axially from a lower surface of said flange body, wherein the step of placing said sprinkler serviceability enhancing apparatus body into said cavity includes a step of seating a bottom surface of said flange section against a surface of said ground, wherein said surface of said ground defines an upper edge of said cavity, wherein said flange reinforcement structures provide support between said lower surface of said flange body and said surface of said ground.

15. The method for enhancing serviceability of the sprinkler head assembly as recited in claim 11, wherein said coupling feature is a threaded aperture, wherein the step of joining said sprinkler head assembly and said threaded pipe section together is accomplished by threading said threaded pipe section through said threaded aperture of said base section.

16. The method for enhancing serviceability of the sprinkler head assembly as recited in claim 11, said sprinkler serviceability enhancing apparatus body further comprising an upper body sealing surface formed in an interior surface of said tubular sidewall, said seal insert further comprising a seal insert upper segment base sealing surface formed in an exterior surface of said seal insert, the method further comprising a step of:

seating said insert upper segment base sealing surface against said upper body sealing surface.

17. The method for enhancing serviceability of the sprinkler head assembly as recited in claim 11, said seal insert further comprising a seal insert upper segment sprinkler sealing surface formed in an interior surface of said seal insert, the method further comprising a step of:

seating an in-ground sprinkler head bottom surface of a sprinkler head of said sprinkler assembly against said seal insert upper segment sprinkler sealing surface.

18. The method for enhancing serviceability of the sprinkler head assembly as recited in claim 11, said sprinkler serviceability enhancing apparatus body further comprising an upper body sealing surface formed as a radially extending surface in an interior surface of said tubular sidewall, said seal insert further comprising a seal insert upper segment base sealing surface formed as a radially extending surface in an exterior surface of said seal insert, the method further comprising a step of:

seating said insert upper segment base sealing surface against said upper body sealing surface.

19. The method for enhancing serviceability of the sprinkler head assembly as recited in claim 11, said seal insert further comprising a seal insert upper segment interior surface defining a sprinkler head receiving section and a seal insert upper segment sprinkler sealing surface formed in a radially extending flange defining a bottom portion of said sprinkler head receiving section, the method further comprising a step of:

seating an in-ground sprinkler head bottom surface of a sprinkler head of said sprinkler assembly against said seal insert upper segment sprinkler sealing surface.

* * * * *